(12) United States Patent
Takashima et al.

(10) Patent No.: US 8,863,296 B2
(45) Date of Patent: *Oct. 14, 2014

(54) INFORMATION PROCESSING APPARATUS, INFORMATION RECORDING MEDIUM, INFORMATION PROCESSING METHOD, AND COMPUTER PROGRAM

(71) Applicants: Yoshikazu Takashima, Tokyo (JP); Kenjiro Ueda, Kanagawa (JP)

(72) Inventors: Yoshikazu Takashima, Tokyo (JP); Kenjiro Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,773

(22) Filed: Oct. 1, 2012

(65) Prior Publication Data
US 2013/0039490 A1    Feb. 14, 2013

Related U.S. Application Data

(63) Continuation of application No. 11/572,476, filed as application No. PCT/JP2005/015410 on Aug. 25, 2005, now Pat. No. 8,327,449.

(30) Foreign Application Priority Data

Aug. 26, 2004   (JP) .................................. 2004-246640

(51) Int. Cl.
*G06F 21/00* (2013.01)
*H04L 9/08* (2006.01)
*G11B 20/00* (2006.01)
*H04L 9/06* (2006.01)

(52) U.S. Cl.
CPC ........ *G11B 20/00086* (2013.01); *H04L 9/0869* (2013.01); *G11B 20/00507* (2013.01); *G11B 20/0021* (2013.01); *G11B 20/00427* (2013.01); *G11B 20/00753* (2013.01); *H04L 9/0643* (2013.01); *H04L 2209/60* (2013.01); *H04L 9/0631* (2013.01); *G11B 20/00528* (2013.01); *G11B 20/00768* (2013.01)
USPC ................................ 726/26; 380/44; 380/239

(58) Field of Classification Search
CPC .... H04L 9/0631; H04L 9/0643; H04L 9/0869
USPC ...................................... 380/44, 239
See application file for complete search history.

(56) References Cited

U.S. PATENT DOCUMENTS 7,203,314 B1 *  4/2007 Kahn et al. .................... 380/239
2003/0061477 A1  3/2003 Kahn et al.
(Continued)

FOREIGN PATENT DOCUMENTS

EP    1185020    3/2002
EP    1185022    3/2002
(Continued)

OTHER PUBLICATIONS

Trappe, "Key Management and Distribution for Secure Multimendia Multicast", 2003, IEEE, vol. 5, pp. 544-557.*
(Continued)

*Primary Examiner* — Taghi Arani
*Assistant Examiner* — Gregory Lane
(74) *Attorney, Agent, or Firm* — K&L Gates LLP

(57) ABSTRACT

A configuration in which use management for each piece of content, which is divided in units, can be performed strictly and efficiently is provided. CPS units such that content stored on an information recording medium is divided into units are set, a unit key is assigned to each CPS unit, and data forming each unit is encrypted and recorded. For reproduction, a unit key is generated, and data processing using the unit key is performed. As information for generating the unit key, copy/play control information (CCI) that is set so as to correspond to the CPS unit and a content hash that is a hash value based on data forming the CPS unit are used. With this configuration, tampering of CCI and data forming the CPS unit can be prevented, and authorized content use can be realized.

9 Claims, 30 Drawing Sheets

(56) References Cited

U.S. PATENT DOCUMENTS

| | | |
|---|---|---|
| 2004/0010509 A1 | 1/2004 | Higashiura et al. |
| 2004/0143661 A1* | 7/2004 | Higashi et al. ............... 709/224 |
| 2004/0144361 A1 | 7/2004 | Wallis |

FOREIGN PATENT DOCUMENTS

| | | | |
|---|---|---|---|
| EP | 1265396 | | 12/2002 |
| EP | 1278330 | | 1/2003 |
| JP | HEI 10-208386 | | 8/1998 |
| JP | HEI 10-320779 | | 12/1998 |
| JP | EP1185020 | * | 4/2001 |
| JP | 2001-167518 | | 6/2001 |
| JP | 2001-216727 | | 8/2001 |
| JP | 2001-331106 | | 11/2001 |
| JP | 2003-050745 | | 2/2003 |
| JP | 2003-069558 | | 3/2003 |
| JP | 2004-007494 | | 1/2004 |
| JP | 2004-152014 | | 5/2004 |
| JP | 2004-158936 | | 6/2004 |
| WO | 2004/053699 | | 6/2004 |
| WO | 2004/064314 | | 7/2004 |

OTHER PUBLICATIONS

Japanese Office Action issued on Aug. 3, 2010 corresponding to Japanese Patent Appln. No. 2004-246640.

International Search Opinion dated Mar. 8, 2007 (6 pages).

International Search Report dated Jun. 12, 2009 corresponding to European Appln. No. 05780934.5.

Ehrsam, "A Cryptographic key Management Scheme for Implementing the data Encryption Standard", 1978, IBM Systems Journal, vol. 17, pp. 106-125.

Japanese Office Action issued on Oct. 19, 2010 corresponding to Japanese Patent Application 2004-246640.

* cited by examiner

FIG. 3

| INDEX, SUCH AS TITLE, WHICH CAN BE DISTINGUISHED IN APPLICATION LAYER | CONTENT MANAGEMENT UNIT (CPS) | UNIT KEY (CPS) |
|---|---|---|
| TITLE 1 | CPS1 | Ku1 |
| TITLE 2 | CPS1 | Ku1 |
| APPLICATION 1 | CPS2 | Ku2 |
| APPLICATION 2 | CPS3 | Ku3 |
| . . | . . | . . |
| DATA GROUP 1 | CPS4 | Ku4 |
| DATA GROUP 2 | CPS5 | Ku5 |
| . . | . . | . . |

FIG. 28

CCI_and_other_info(): EXAMPLE OF BASIC INFORMATION

| (NAME) | (DESCRIPTION) |
|---|---|
| COPY CAPABILITY/INCAPABILITY INFORMATION | COPY CAPABLE/INCAPABLE/CAPABLE FOR ONLY ONE GENERATION |
| VIDEO OUTPUT RESOLUTION LIMITATION INFORMATION | PRESENCE/ABSENCE OF OUTPUT LIMITATION |
| ANALOG COPY LIMITATION INFORMATION | CAPABLE/INCAPABLE (ANALOG COPY PREVENTION TECHNOLOGY TO BE USED IS SPECIFIED) |
| INFORMATION INDICATING PRESENCE OR ABSENCE OF ENCRYPTION | PRESENCE/ABSENCE OF ENCRYPTION |
| INFORMATION INDICATING PRESENCE OR ABSENCE OF RIGHTS ASSERTION | PRESENCE/ABSENCE OF RIGHTS ASSERTION |

CCI_and_other_info(): EXAMPLE OF EXTENDED INFORMATION

| (NAME) | (DESCRIPTION) |
|---|---|
| REPRODUCTION CAPABILITY/INCAPABILITY INFORMATION WITH DISC ALONE | INDICATES WHETHER OR NOT CONTENT REPRODUCTION IS POSSIBLE USING ONLY INFORMATION ON DISC |
| METHOD OF REPRODUCING CONTENT THAT CANNOT BE REPRODUCED WITH DISC ALONE | "CONNECT TO KEY DISTRIBUTION SERVER", "INSERT MEMORY CARD IN WHICH KEY IS PUT", etc. |
| DESIGNATION OF SERVER | INDEX VALUE TO SERVER LIST |
| COPY STREAMING COMPATIBILITY INFORMATION | COMPATIBILITY INFORMATION FOR ALLOWING CONTENT TO BE REPRODUCED BY ANOTHER DEVICE IN NETWORK |
| DATA CONVERSION METHOD DURING COPY STREAMING | METHOD THAT CAN BE USED WHEN CONTENT IS TO BE CONVERTED INTO THAT FOR ANOTHER DEVICE |
| CAPABILITY/INCAPABILITY OF COPYING ONTO SAME TYPE OF RECORDING MEDIUM IN NETWORK | OK/NG |
| NUMBER OF TIMES OF COPYING ONTO SAME TYPE OF RECORDING MEDIUM IN NETWORK | NUMBER OF TIMES |
| EXPIRATION PERIOD OF COPYING ONTO SAME TYPE OF RECORDING MEDIUM IN NETWORK | EXPIRATION PERIOD |
| CAPABILITY/INCAPABILITY OF COPYING ONTO ANOTHER TYPE OF RECORDING MEDIUM IN NETWORK | OK/NG |
| NUMBER OF TIMES OF COPYING ONTO ANOTHER TYPE OF RECORDING MEDIUM IN NETWORK | NUMBER OF TIMES |
| EXPIRATION PERIOD OF COPYING ONTO ANOTHER TYPE OF RECORDING MEDIUM IN NETWORK | EXPIRATION PERIOD |
| PRESENCE/ABSENCE OF DATA TO BE COPIED ONTO ANOTHER TYPE OF RECORDING MEDIUM IN NETWORK | OK/NG |
| DESIGNATION OF DATA TO BE COPIED ONTO ANOTHER TYPE OF RECORDING MEDIUM IN NETWORK | INDEX VALUE FOR DESIGNATING DATA TO BE COPIED |
| CAPABILITY/INCAPABILITY OF COPYING INTO MOBILE PHONE | OK/NG |
| NUMBER OF TIMES OF COPYING INTO MOBILE PHONE | NUMBER OF TIMES |
| EXPIRATION PERIOD OF COPYING INTO MOBILE PHONE | EXPIRATION PERIOD |
| PRESENCE/ABSENCE OF DATA TO BE COPIED INTO MOBILE PHONE | OK/NG |
| DESIGNATION OF DATA TO BE COPIED INTO MOBILE PHONE | INDEX VALUE FOR DESIGNATING DATA TO BE COPIED |
| CAPABILITY/INCAPABILITY OF STREAMING | OK/NG |
| DESIGNATION OF TARGET DEVICE FOR STREAMING RECEPTION | LIMITS TARGET DEVICE |
| CAPABILITY/INCAPABILITY OF REMOTE REPRODUCTION | OK/NG |
| DESIGNATION OF TARGET DEVICE FOR REMOTE REPRODUCTION RECEPTION | LIMITS TARGET DEVICE |
| PROCESS WHEN USE OF CONTENT IN NETWORK IS TO BE COMPLETED | INSTANTLY NULLIFIES COPYING, NULLIFIES AFTER FIXED PERIOD OF TIME, ERASE, etc. |
| DOWNLOAD DATA TYPE | TYPE OF DOWNLOAD DATA (SUBTITLES, AUDIO, STILL IMAGE, etc.) |
| METHOD OF OBTAINING DOWNLOAD DATA | "CONNECT TO DOWNLOAD SERVER", "INSERT MEMORY CARD IN WHICH DATA IS PLACED", etc. |
| DESIGNATION OF DOWNLOAD SERVER | INDEX VALUE TO DOWNLOAD SERVER LIST |
| OBTAINING OPERATION CONTROL INFORMATION FROM SERVER | COMPLIES WITH OPERATION CONTROL INFORMATION OBTAINED FROM SERVER |
| DESIGNATION OF SERVER FOR OBTAINING OPERATION CONTROL INFORMATION | INDEX VALUE TO SERVER LIST INDICATING SERVERS FOR OBTAINING OPERATION CONTROL INFORMATION |

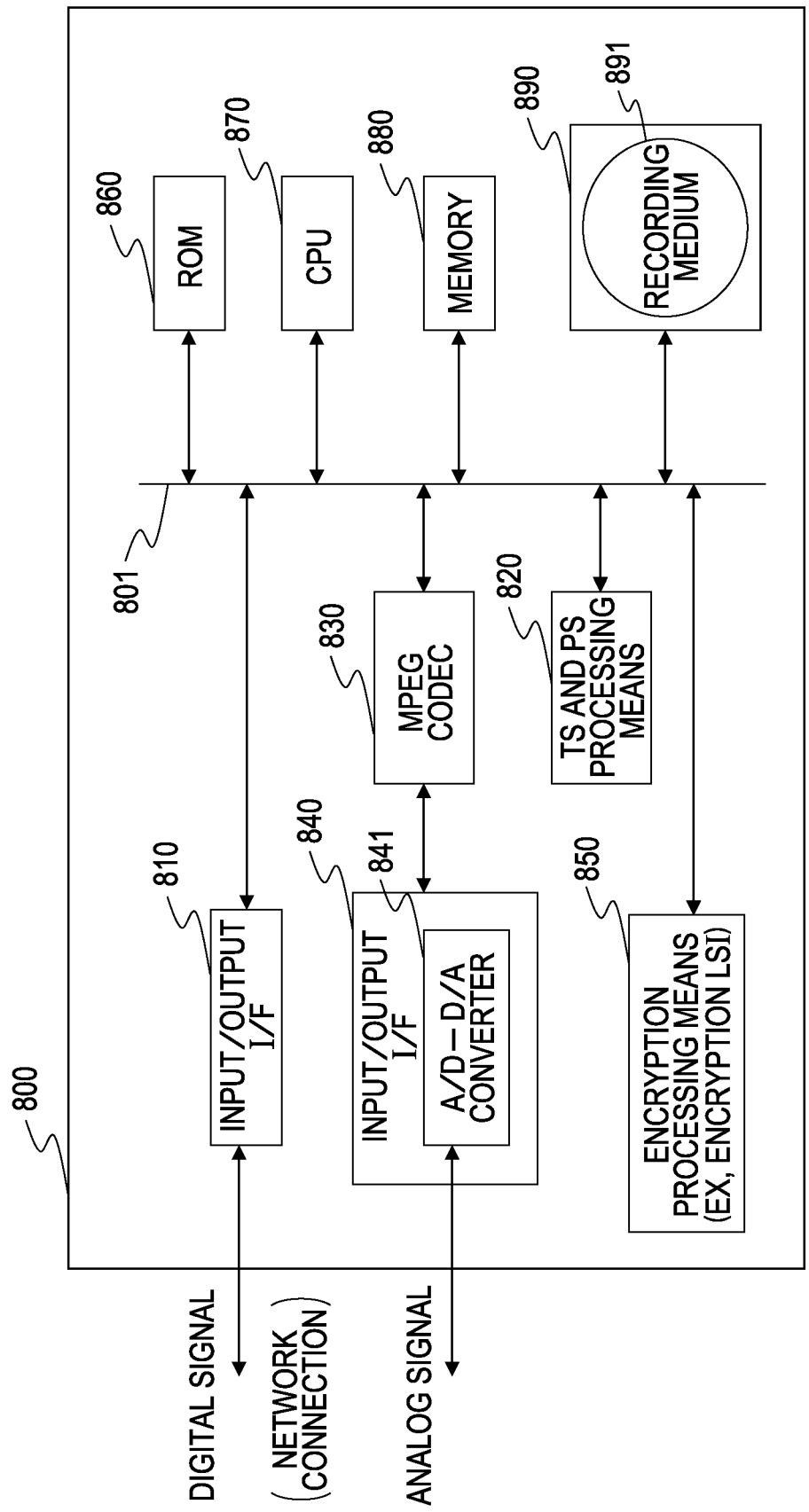

INFORMATION PROCESSING APPARATUS, INFORMATION RECORDING MEDIUM, INFORMATION PROCESSING METHOD, AND COMPUTER PROGRAM

CROSS REFERENCES TO RELATED APPLICATIONS

The present application is a continuation of U.S. patent application Ser. No. 11/572,476, filed Jan. 22, 2007, which is a National Stage of International Application No. PCT/JP2005/015410, filed Aug. 25, 2005, which claims priority to Japanese Patent Application JP 2004-246640 filed in the Japanese Patent Office on Aug. 26, 2004, the entire contents of which being incorporated herein by reference.

BACKGROUND

The present application relates to an information processing apparatus, an information recording medium, an information processing method, and a computer program. more particularly, the present application relates to an information processing apparatus for storing various kinds of content for which content use management is required and for realizing use management of each of subdivided data units, to an information recording medium for use therewith, to an information processing method for use therewith, and to a computer program for use therewith.

Various software data, such as audio data such as music, image data such as movies, game programs, and various kinds of application programs (hereinafter, these will be referred to as "content"), can be stored as digital data on a recording medium, for example, a Blu-ray disc in which a blue laser is used, a DVD (Digital Versatile Disc), an MD (Mini Disc), and a CD (Compact Disc). in particular, a Blu-ray disc using a blue laser is a disc capable of high-density recording and is capable of recording a large amount of video content or the like as high-quality data.

Digital content is stored in these various information recording media and is provided to a user. The user reproduces and uses content in an owned reproduction device, such as a PC (Personal Computer) or a disk player.

In general, sales rights or the like of most content, such as music data and image data, are held by the creator thereof or the seller thereof. Therefore, when distributing these pieces of content, it is common practice that a fixed use limitation is imposed, that is, use of content is permitted for an authorized user so that copying without permission or the like will not be performed.

According to a digital recording apparatus and a recording medium, images and audio can be repeatedly recorded and reproduced without degrading them. Therefore, problems such as those described below have occurred: the distribution of illegally copied content via the Internet, the distribution of so-called pirated discs produced using a CD-R and the like, onto which content has been recorded, and wide use of copied content stored in a hard disk of a PC or the like.

It is possible for a DVD or a large-capacity recording medium, such as a recording medium using a blue laser whose development has progressed in recent years, to record a large amount of data for one to several movies as digital information on one medium. When it has become able to record video information and the like as digital information in the manner described above, it has become increasingly important to prevent illegal copying and protect a copyright owner. In recent years, in order to prevent such illegal copying of digital data, various technologies for preventing illegal copying to digital recording apparatuses and recording media have been implemented.

For example, in a DVD player, a content scramble system is adopted. in the content scramble system, video data, audio data, and the like are encrypted and recorded on a DVD-ROM (Read Only Memory). a key used to decrypt encrypted data is given to a licensed DVD player. The license is given to a DVD player that is designed to comply with predetermined operation definitions such that illegal copying is not performed. Therefore, in the licensed DVD player, by decrypting the encrypted data recorded on a DVD-ROM by using a given key, images and audio can be reproduced from the DVD-ROM.

On the other hand, since a non-licensed DVD player does not have a key for decrypting encrypted data, it is not possible to decrypt encrypted data recorded on a DVD-ROM. as described above, in the content scramble system, a DVD player that does not satisfy conditions required at license time cannot play a DVD-ROM having digital data recorded thereon, so that illegal copying is prevented.

On the other hand, as a data communication network has become popular in recent years, a so-called home network has penetrated, in which household electrical appliances, a computer, and other peripheral devices are network-connected, so that communication among the devices is made possible. The home network provides convenience and comfortability to a user in such a way that data processing functions of the devices are shared and content is transmitted and received among the devices by performing communication among the network-connected devices. it is expected that the home network will become more popular in the future.

With the progress of such networking, it becomes more often that content stored on an information recording medium is used by accessing it from a device that is connected to a home network. The above-described illegal copying prevention system of the related art is based on the concept that, for example, content reproduction is permitted in only one licensed reproduction apparatus. Therefore, in a network-connected device, sufficient consideration has not been given to deal with processing in which a device into which a recording medium is loaded, for example, a home server or a player is accessed from another network-connected device, for example, a PC or a TV, and the content is reproduced via a network.

In the related art, usage such that one piece of content stored on a recording medium is used by one reproduction apparatus is predominant. Therefore, it is suffice to perform use management of content by setting a content using right, such as a license, to the content or the reproduction apparatus. However, at the present time in which an information recording medium has a larger capacity and devices in a home have become increasingly digitized and networked, content use management structure differing from the past structure has become necessary. Specifically, demands described below have occurred.

(1) Realization of the configuration in which a plurality of pieces of content are recorded on a recording medium, and use management is made possible for each piece of content.

(2) Realization of use of content in a specific network such as a network in a home, that is, content use management structure for permitting content reproduction by a network-connected device or content copying from a home server.

(3) Realization of the configuration in which information necessary for content reproduction, for example, a key used for decrypting content, is securely distributed to a specific user via a network.

There has been a demand for realizing the configuration of (1) to (3) described above.

SUMMARY

The present application has been made in view of such circumstances. an object of the present application is to provide an information processing apparatus for realizing copyright management and use management for each piece of data of content stored on a recording medium in content use of an information recording medium on which various kinds of content requiring use management such as copyright management are stored, an information recording medium for use therewith, an information processing method for use therewith, and a computer program for use therewith.

Another object of the present application is to provide an information processing apparatus for preventing tampering of content and copy/play control information, for revoking unauthorized content use, and for realizing strict and efficient content use management by setting copy/play control information corresponding to content divided into content management units or a hash value of content as information for generating a unit key, which is an encryption key corresponding to the content management unit, an information recording medium, an information processing method, and a computer program.

A first aspect of the present application is an information processing apparatus for performing a process for reproducing content from an information recording medium, the information processing apparatus including encryption processing means for performing a process for decrypting encrypted content recorded on the information recording medium, wherein the encryption processing means generates a unit key corresponding to each of a plurality of content management units stored on the information recording medium and decrypts content stored on the information recording medium by data processing using the unit key, and in the generation of the unit key, the encryption processing means performs data processing using data forming copy/play control information that is set so as to correspond to the content management unit.

In an embodiment of the information processing apparatus, in the generation of the unit key, the encryption processing means performs data processing using a content hash that is a hash value based on the data forming the content management unit.

In an embodiment of the information processing apparatus, in the generation of the unit key, the encryption processing means performs data processing using a recording seed corresponding to the content management unit.

In an embodiment of the information processing apparatus, in the generation of the unit key, the encryption processing means performs an AES encryption process using data read from the information recording medium or performs data processing on the basis of a hash function.

In an embodiment of the information processing apparatus, in the generation of the unit key, the encryption processing means performs a process using key data, obtained by performing a decryption process using a device key stored on the information recording medium, on an encrypted key block that is data read from the information recording medium.

A second aspect of the present application is a content management system including a management center for providing management information for content use management, a content editing entity for performing a content editing process, and an information recording medium manufacturing entity for receiving edited content from the content editing entity and for recording the content on the information recording medium wherein the management center provides, as the management information, encrypted key block data in which a media key used for decrypting content is stored as encrypted data to either one of the content editing entity and the information recording medium manufacturing entity, one of the content editing entity and the information recording medium manufacturing entity generates a unit key corresponding to each of a plurality of content management units stored on the information recording medium and encrypts data forming the content management unit by using the unit key, and in the generation of the unit key, performs data processing using data forming copy/play control information that is set so as to correspond to the content management unit.

In an embodiment of the content management system, in the generation of the unit key, one of the content editing entity and the information recording medium manufacturing entity performs data processing using a content hash that is a hash value based on data forming the content management unit.

In an embodiment of the content management system, in the generation of the unit key, one of the content editing entity and the information recording medium manufacturing entity performs data processing using a recording seed corresponding to the content management unit.

A third aspect of the present application is an information recording medium having recorded thereon content for which use management is performed, wherein at least one content management unit is contained as recording data, and data contained in the content management unit is stored as encrypted data using a unit key generated by data processing using data forming copy/play control information that is set so as to correspond to the content management unit.

In an embodiment of the information recording medium, the unit key is a key generated by data processing using a content hash that is a hash value based on data forming the content management unit.

In an embodiment of the information recording medium, the unit key is a key generated by data processing using a recording seed corresponding to the content management unit.

A fourth aspect of the present application is an information processing method for reproducing content from an information recording medium, the information processing method including a unit key generation step of generating a unit key corresponding to each of a plurality of content management units stored on the information recording medium; and a decryption step of decrypting content stored on the information recording medium by data processing using the unit key, wherein the unit key generation step includes a step of performing data processing using data forming copy/play control information that is set so as to correspond to the content management unit.

In an embodiment of the information processing method, the unit key generation step includes a step of performing data processing using a content hash that is a hash value based on data forming the content management units.

In an embodiment of the information processing method, the unit key generation step includes a step of performing data processing using a recording seed corresponding to the content management unit.

In an embodiment of the information processing method, the unit key generation step includes a step of performing an AES encryption process using data read from the information recording medium or data processing based on a hash function.

In an embodiment of the information processing method, the unit key generation step includes a step of performing a process using key data obtained by performing a decryption process using a device key stored on the information recording medium on an encrypted key block that is data read from the information recording medium.

A fifth aspect of the present application is an information processing method for generating content to be recorded on an information recording medium, the information processing method including a unit key generation step of generating a unit key corresponding to each of a plurality of content management units stored on the information recording medium; and an encryption step of encrypting content to be stored on the information recording medium by data processing using the unit key, wherein the unit key generation step includes a step of performing data processing using data forming copy/play control information that is set so as to correspond to the content management unit.

In an embodiment of the information processing method, the unit key generation step includes a step of performing data processing using a content hash that is a hash value based on data forming the content management unit.

In an embodiment of the information processing method, the unit key generation step includes a step of performing data processing using a recording seed corresponding to the content management unit.

A sixth aspect of the present application is a computer program for enabling a computer to reproduce content from an information recording medium, the computer program including a unit key generation step of generating a unit key corresponding to each of a plurality of content management units stored on the information recording medium; and a decryption step of decrypting content stored on the information recording medium by data processing using the unit key, wherein the unit key generation step includes a step of performing data processing using data forming copy/play control information that is set so as to correspond to the content management unit.

A seventh aspect of the present application is a computer program for enabling a computer to generate content to be recorded on an information recording medium, the computer program including a unit key generation step of generating a unit key corresponding to each of a plurality of content management units stored on the information recording medium; and an encryption step of encrypting content to be stored on the information recording medium by data processing using the unit key, wherein the unit key generation step includes a step of performing data processing using data forming copy/play control information that is set so as to correspond to the content management unit.

The computer program of the present application is, for example, a computer program that can be provided to a computer system capable of executing various program codes by means of a storage medium or a communication medium for providing the program codes in a computer-readable format, for example, a recording medium such as a CD, an FD, or an MO, or a communication medium such as a network. As a result of providing such a program in a computer-readable format, processing corresponding to the program is realized in the computer system.

Further other objects, features, and advantages of the present application will become apparent from the more detailed description based on the embodiments of the present application as will be described later and the attached drawings. In this specification, the system designates a logical assembly of a plurality of devices. It is not essential that the devices be disposed in the same housing.

According to a configuration in an embodiment, content management units (CPS units) in which content stored on an information recording medium is divided into units are set. A unit key is assigned to each management unit (CPS unit), and data forming each unit is encrypted and recorded. During reproduction, it is necessary that a unit key is generated, and data processing using the unit key is performed. Furthermore, as information for generating the unit key, copy/play control information (CCI) that is set so as to correspond to the content management unit (CPS unit) and a content hash, which is a hash value based on data forming the content management unit (CPS unit), are used. Therefore, when copy/play control information (CCI) and content data are tampered, it becomes not possible to generate a correct unit key, the copy/play control information (CCI) and the content data can be prevented from being tampered, unauthorized content use can be revoked, and authorized content use can be realized. In addition, in the reproduction apparatus, it is not necessary to perform a process for verifying presence or absence of data tampering, and efficient data reproduction becomes possible.

Additional features and advantages of the present application are described in, and will be apparent from, the following Detailed Description and the figures.

BRIEF DESCRIPTION OF THE FIGURES

FIG. 3 shows an example of a content management unit and unit key management table.

FIG. 28 shows a specific example of basic control information (basic CCI) and extended control information (extended CCI).

FIG. 30 illustrates an example of the configuration of an information processing apparatus for recording and reproducing information into and from a loaded information recording medium.

DETAILED DESCRIPTION

Figure 1:
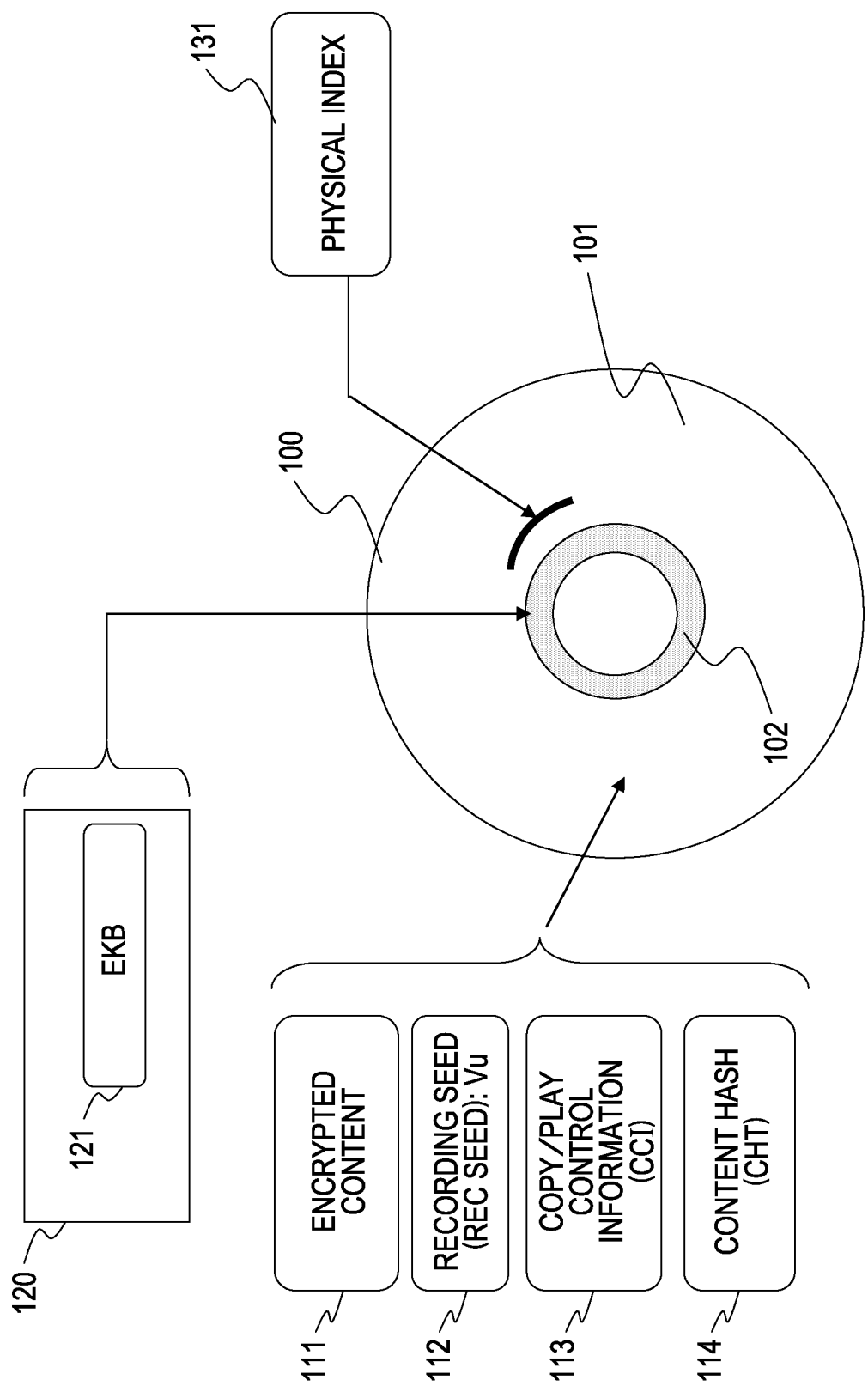
FIG. 1 illustrates the structure of data stored on an information recording medium.

With reference to the drawings, a description will be given below of an information processing apparatus, an information recording medium, an information processing method, and a computer program according to an embodiment of the present application. The description is given in accordance with the following items.

1. Structure of data stored on an information recording medium
2. Encryption of stored content and use management structure
3. Manufacture of information recording media and details of data storage process
4. Content reproduction process in the information processing apparatus
5. Recording data on an information recording medium, and details of content encryption and decryption processes
6. Detailed structure of copy/play control information (CCI)
7. Example of the configuration of the information processing apparatus

[1. Structure of Data Stored on an Information Recording Medium]

A description will be given first of the structure of data stored on an information recording medium. FIG. 1 shows an example of an information recording medium having stored thereon content to which processing of the present application can be applied. Here, an example of information storage of a ROM disc as a content-stored disc is shown.

The ROM disc is, for example, an information recording medium, such as a Blu-ray disc or a DVD, and also is an information recording medium on which valid content is stored, which is manufactured in a disc manufacturing factory under a permission of a so-called content right owner having an authorized content copyright or an authorized selling right. In the following embodiment, a description will be given by using a disc-type medium as an example of an information recording medium. In addition, the present application can be applied to a configuration in which information recording media in various formats are used.

As shown in FIG. 1, an information recording medium 100 has a data storage area 101 for storing data such as content and a lead-in area 102 for storing related information corresponding to a disc and stored content, and key information used for a content decryption process.

In the data storage area 101, encrypted content 111, a recording seed (REC SEED) 112 serving as information that is necessary for generating a key used to decrypt encrypted content, CCI (Copy Control Information) 113 as content copy/play control information, and a content hash 114 serving as a hash value of content are stored. the recording seed (REC SEED) 112, the CCI (Copy Control Information) 113, and the content hash 114 are used as information for generating an encryption key (unit key) used for encrypting and decrypting content. The detailed structure thereof will be described later.

In the lead-in area 102, encryption key information 120 necessary for generating a key used for decrypting the encrypted content 111 is stored. the encryption key information 120 contains an EKB (Enabling Key Block) 121 as an encrypted key block that is generated on the basis of a tree-structure key distribution system, which is known as one type of broadcast encryption method. Furthermore, on the information recording medium 100, a physical index 131 is recorded. the outline of these various pieces of information will be described below.

(1) Encrypted Content 111

On the information recording medium 100, various pieces of content are stored. they are, for example, main content composed of AV (Audio Visual) streams of moving image content such as HD (High Definition) movie content that is high-precision moving image data, game programs in a format defined by a specific standard, an image file, audio data, and text data. These pieces of content are specific AV-format standard data and are stored in accordance with a specific AV data format. Specifically, they are stored, for example, as Blu-ray disc ROM standard data in accordance with the Blu-ray disc ROM standard format.

Furthermore, there is also a case in which, for example, a game program, an image file, audio data, text data, and the like serving as service data are stored as subcontent. The subcontent is data having a data format that does not comply with a specific AV data format. That is, the subcontent can be stored as nonstandard Blu-ray disc ROM data in an optional format that does not comply with the Blu-ray disc ROM standard format.

Together with the main content and the subcontent, kinds of content include various kinds of content, such as music data, image data such as a moving image and a still image, a game program, WEB content, and the like. These pieces of content contain various kinds of information, such as content information that can be used with only data from the information recording medium 100, and content information that can be used in combination with data from the information recording medium 100 and data that is provided from a server connected via a network.

(2) Recording Seed 112

Each content or a set of a plurality of pieces of content is each subjected to encryption using a separate encryption key (unit key) and is stored on the information recording medium 100 for the purpose of content use management. that is, AV (Audio Visual) streams forming content, music data, image data such as moving images and still images, game programs, WEB content, and the like are divided into units as content use management units, and a recording seed Vu 112 different for each divided unit is assigned.

For using content, an encryption key (unit key) corresponding to each unit is assigned in accordance with a predetermined encryption key generation sequence using the recording seed Vu 112 and the encryption key information 120. The unit at which one unit key is assigned is referred to as a content management unit (CPS unit). That is, the encrypted content 111 is divided in CPS units, is encrypted using a unit key corresponding to each CPS unit, and is stored on the information recording medium 100.

(3) Copy/Play Control Information (CCI) 113

The copy/play control information (CCI) 113 is copy limitation information or playback limitation information for use control corresponding to the encrypted content 111 stored on the information recording medium 100. The copy/play control information (CCI) 113 can be set variously, for example, being set as information for each CPS unit or being set so as to correspond to a plurality of CPS units. The details of this information will be described later.

(4) Content Hash 114

The content hash 114 is a hash value based on data forming content or encrypted content stored on the information recording medium 100, and is also data used as information for generating an encryption key used for content encryption and decryption processes. The manner of generating and using the content hash 114 will be described later.

(5) Physical Index 131

In the physical index 131, the category information of the information recording medium, for example, disc-related information such as the type of disc, and content-related information corresponding to the content stored in the data area 101, are recorded. Furthermore, similarly to the recording seed 112, there is also a case in which key information (key generation information) for generating a key used for decrypting encrypted content stored in the data storage area 101 of the information recording medium is recorded. The physical index 113 may be recorded in the lead-in area 102.

(6) Encryption Key Information 120

Similarly to the above-described recording seed 112, the encryption key information 120 includes an encrypted key block for obtaining key information (key generation information) for generating a key used for decrypting encrypted content stored in the data storage area 101 of the information recording medium, that is, an EKB (Enabling Key Block) 121 serving as an encrypted key block that is generated on the basis of a tree-structure key distribution system, which is known as one type of broadcast encryption method.

The EKB 121 is a key information block in which a media key (Km) that is a key necessary for decrypting content can be obtained by only the process (decryption) based on a device key stored in an information processing apparatus of a user having a valid license. this is such that the information distribution method in accordance with a so-called hierarchical tree structure enables a key to be obtained only when the user device (information processing apparatus) has a valid license, and can prevent a key (media key) of the user device that has been nullified (revoked) from being obtained. as a result of changing the key information to be stored in the EKB, it is possible for the management center to generate an EKB having a structure in which content cannot be decrypted using a device key stored in a specific user device, that is, a media key necessary for decrypting content cannot be obtained. Therefore, it is possible to revoke an unauthorized device at any timing and possible to provide encrypted content that can be decrypted to only a device having a valid license.

[2. Encryption of Stored Content and Use Management Structure]

Next, a description will be given, with reference to FIG. 2 and subsequent figures, of content management structure for realizing use control that differs for each of a plurality of pieces of content such that content stored on an information recording medium is divided.

As described above, content stored on the information recording medium is assigned with a key (unit key) that differs for each divided piece of content, is encrypted, and is stored for the purpose of realizing use control different for each piece of divided content. The unit at which one unit key is assigned is referred to as a content management unit (CPS unit).

When content belonging to each unit is encrypted using each unit key and the content is to be used, the key (unit key) assigned to each unit is obtained and reproduction is performed. each unit key can be managed individually. for example, a unit key to be assigned to a particular unit A is set as a key that can be obtained from the information recording medium. Furthermore, a unit key to be assigned to a unit B can be obtained under the condition in which access is made to a server that is connected to a network and a user has performed a predetermined procedure. For example, the structure for obtaining and managing a key corresponding to each unit can be formed to be independent of each unit key.

A description will now be given, with reference to FIG. 2, of the manner of setting the unit at which one key is assigned, that is, the content management unit (CPS unit).

Figure 2:
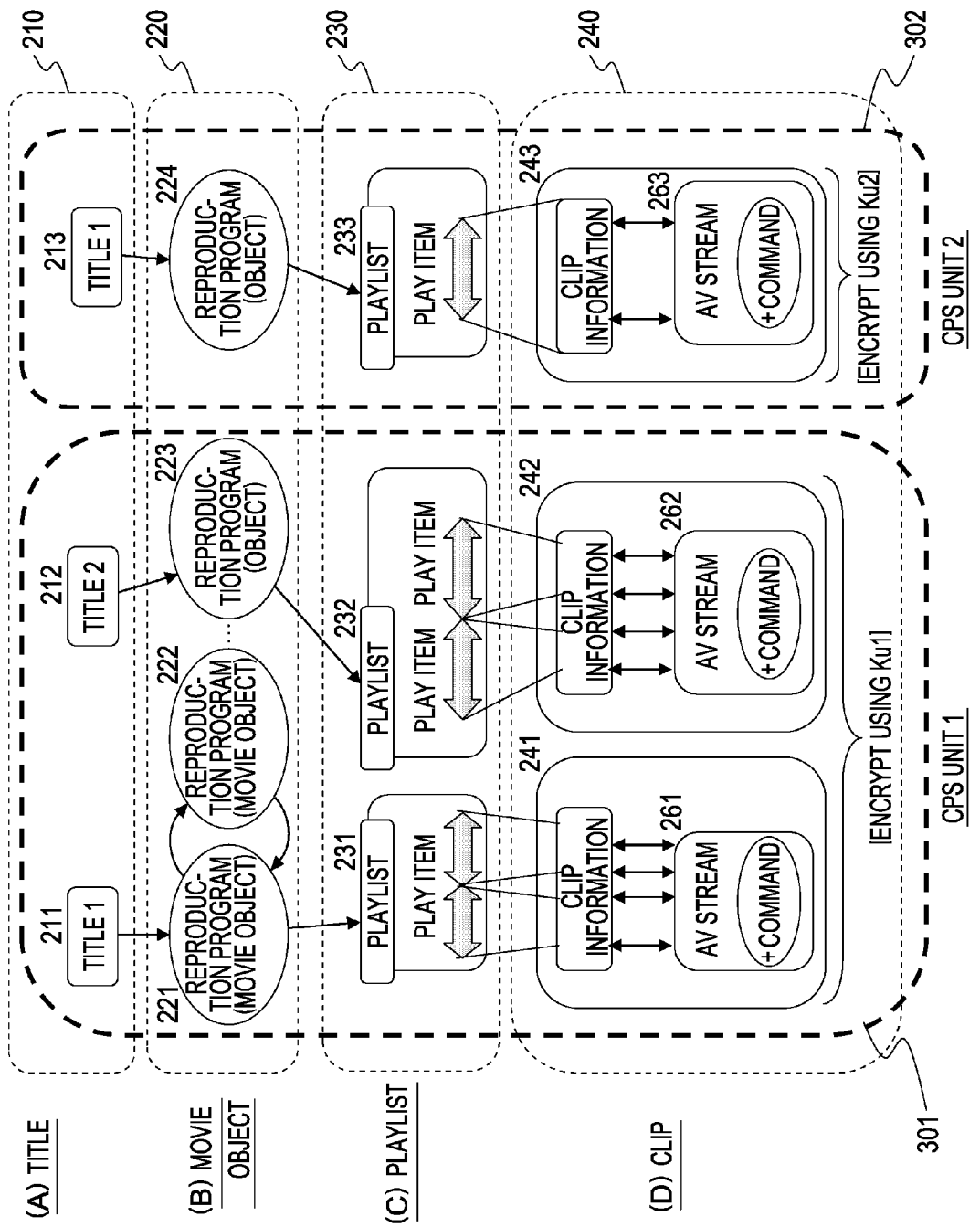
FIG. 2 illustrates an example of the setting of content management units to be set to content stored on an information recording medium.

As shown in FIG. 2, content has a hierarchical structure of (A) a title 210, (B) a movie object 220, (C) a playlist 230, and (D) a clip 240. when a title as an index file that is accessed by a reproduction application, a reproduction program associated with the title is specified, a playlist that specifies a content reproduction sequence or the like in accordance with the program information of the specified reproduction program is selected, an AV stream as actual content data or a command is read on the basis of the clip information specified by the playlist, the AV stream is reproduced, and the command is executed.

FIG. 2 shows two CPS units. These constitute part of the content stored on the information recording medium. Each of CPS units 1 and 301 and CPS units 2 and 302 is a CPS unit that is set as a unit including a title as an application index, a movie object as a reproduction program file, a playlist, and a clip containing an AV stream file as actual content data.

The content management units (CPS units) 1 and 301 include titles 1 and 211, titles 2 and 212, reproduction programs 221 and 222, playlists 231 and 232, and clips 241 and 242. The AV stream data files 261 and 262, which are actual data of content contained in the two clips 241 and 242, are encrypted using a unit key Ku1, which is an encryption key that is set so as to correspond to the content management units (CPS units) 1 and 301.

The content management units (CPS unit) 2 and 302 include titles 3 and 213, a reproduction program 224, a playlist 233, and a clip 243. an AV stream data file 263, which is actual data of content contained in the clip 243, is encrypted using a unit key Ku2, which is an encryption key that is set so as to correspond to the content management units (CPS unit) 2 and 302.

For example, in order for the user to perform an application file or a content reproduction process corresponding to the content management units 1 and 301, it is necessary to obtain the unit key Ku1 as an encryption key that is set so as to correspond to the content management units (CPS units) 1 and 301 and necessary to perform a decryption process. After the decryption process is performed, an application program can be executed to reproduce content. In order to perform an application file or a content reproduction process corresponding to the content management units 2 and 302, it is necessary to obtain a unit key Ku2 serving as an encryption key that is set so as to correspond to the content management units (CPS units) 2 and 302, and necessary to perform a decryption process.

The reproduction application program to be executed in the information processing apparatus for reproducing content identifies a content management unit (CPS unit) corresponding to content specified to be reproduced by the user, and performs a process for obtaining a CPS encryption key corresponding to the identified CPS management unit information. When the CPS encryption key cannot be obtained, a message indicating that reproduction is not possible is displayed, and the like. Furthermore, the reproduction application program detects an occurrence of switching of the content management unit (CPS unit) when the content is reproduced, obtains a necessary key, displays a message indicating that reproduction is not possible, and the like.

The reproduction application program performs playback management on the basis of a unit structure and unit key management table shown in FIG. 3. the unit structure and unit key management table, as shown in FIG. 3, is a table in which indexes of application layers or application files, the content management units (CPS units) corresponding to data groups, and unit key information are made to correspond to one another. The reproduction application program performs management on the basis of the management table.

When, for example, the reproduction application program detects an occurrence of switching of the content management unit (CPS unit) as a result of the switching of the application index, the reproduction application program switches the key to be used by switching the content management unit (CPS unit). Alternatively, the reproduction application program performs a process for displaying a message indicating that a unit key needs to be obtained.

For example, in a case in which the unit key Ku1 of the content management units (CPS units) 1 and 301 is stored in the reproduction apparatus that is performing a content reproduction process and the unit key Ku2 of the content management units (CPS units) 2 and 302 is also stored therein, when the reproduction application program for centrally controlling the content reproduction process detects that the unit of the application has been switched or content has been switched, the reproduction application program switches the unit key corresponding to the switching of the content management unit (CPS unit), that is, switches from Ku1 to Ku2.

In a case in which the unit key Ku1 of the content management units (CPS units) 1 and 301 is stored in the reproduction apparatus that is performing a content reproduction process and the unit key Ku2 of the content management units (CPS units) 2 and 302 is not stored therein, when the reproduction application program for centrally controlling the content reproduction process detects that the unit of the application reproduction process has been switched or the content has been switched, the reproduction application program performs a process for displaying a message indicating that a unit key needs to be obtained.

[3. Manufacture of Information Recording Media and Details of Data Storage Process]

Figure 4:
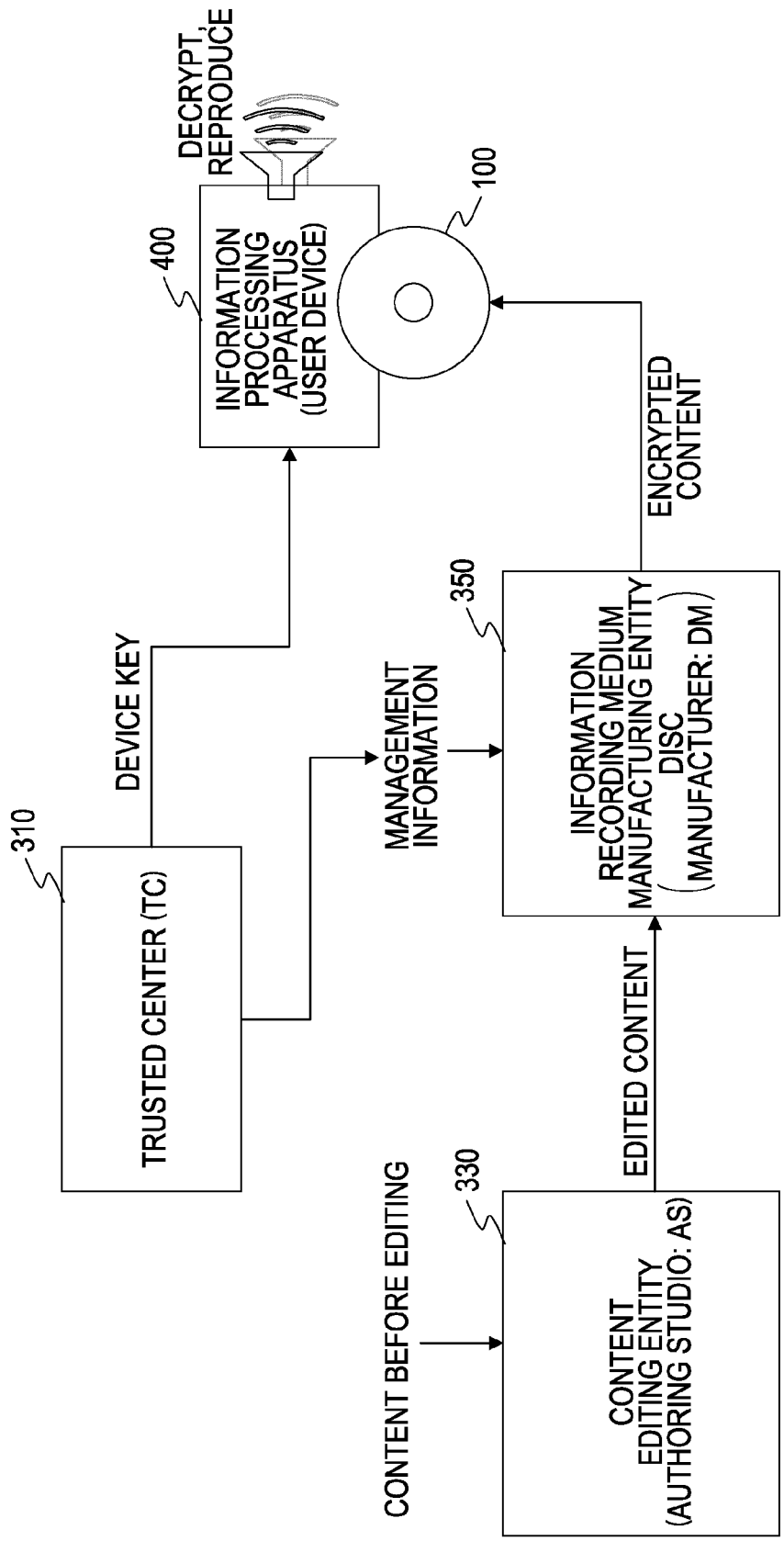
FIG. 4 illustrates an example of processing in a step of manufacturing an information recording medium and information management structure.

As described above, the information recording medium 100 contains the encrypted content 111 and also various key information necessary for decrypting and reproducing the encrypted content 111, that is, key generation information necessary for generating a unit key. Referring to FIG. 4, the manufacturing route of the information recording medium will be described below.

As shown in FIG. 4, content stored on the information recording medium is edited by a content editing entity (AS: Authoring Studio) 330. Thereafter, in an information recording medium manufacturing entity (DM: Disc Manufacturer) 350, for example, CDs, DVDs, Blu-ray discs, and the like are replicated in large volumes, and the information recording medium 100 is manufactured and provided to the user. the information recording medium 100 is reproduced in a device (information processing apparatus) 400 of the user.

A management center (TC: Trusted Center) 310 performs management for the entire processing of manufacturing, selling, and using discs. the management center (TC: Trusted Center) 310 provides, to the information recording medium manufacturing entity (DM: Disc Manufacturer) 350, various management information, for example, a media key Km that is set so as to correspond to a medium (information recording medium) and an EKB serving as an encrypted key block in which the media key Km is stored as encrypted data. On the basis of the management information received from the management center (TC: Trusted Center) 310, the information recording medium manufacturing entity (DM: Disc Manufacturer) 350 performs processes for editing and encrypting content received from the content editing entity (AS: Authoring Studio) 330, and processes for generating and storing the key information. Furthermore, the management center (TC: Trusted Center) 310 manages and provides a device key to be stored in the information processing apparatus 400 of the user.

A description will now be given, with reference to FIGS. 5 and 6, of examples of two processes to be performed by the management center 310, the content editing entity 330, and the information recording medium manufacturing entity 350.

Figure 5:
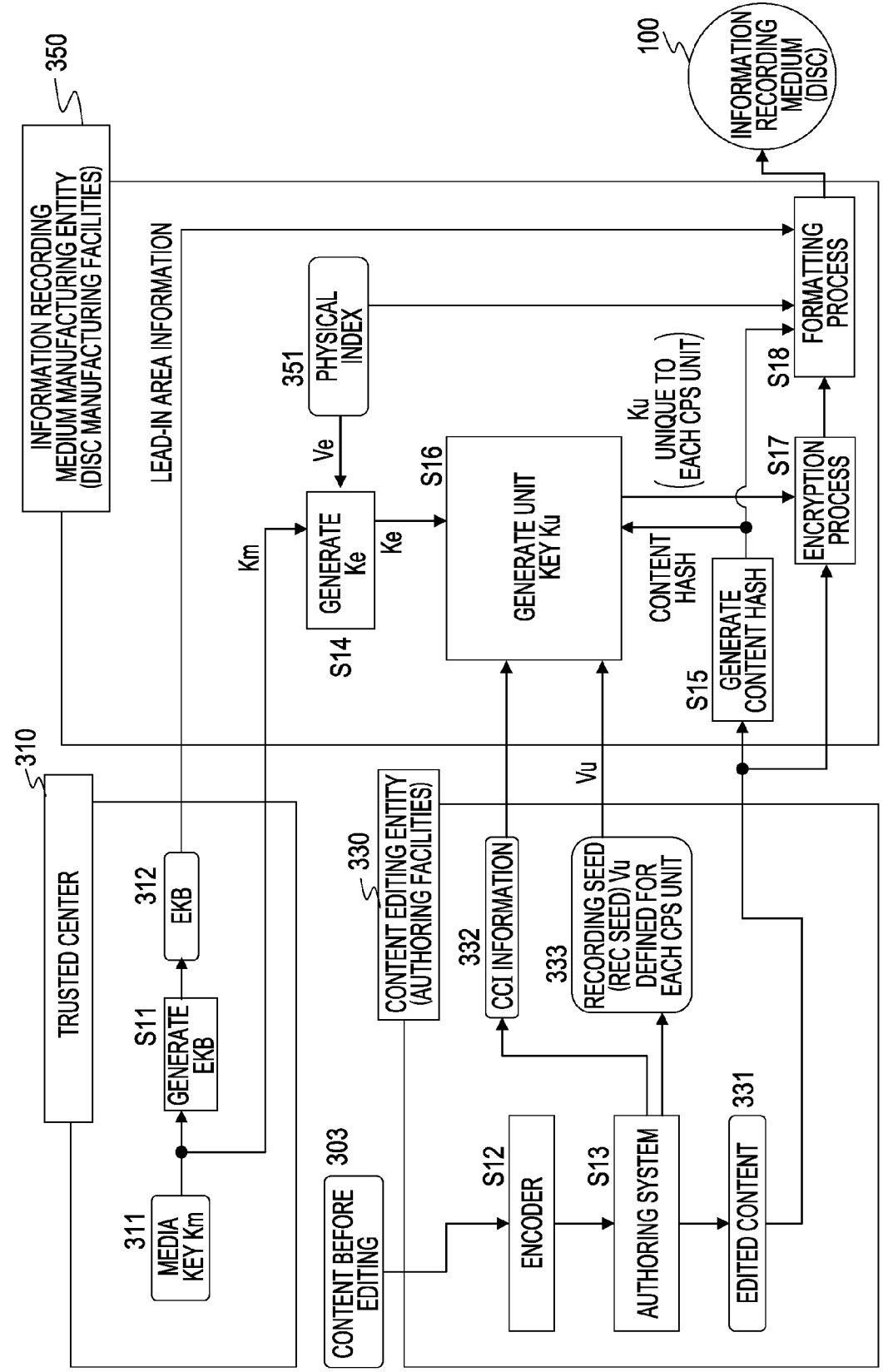
FIG. 5 illustrates an example of processing to be performed by a management center, a content editing entity, and an information recording medium manufacturing entity.

FIG. 5 shows an example of one process to be performed by the management center 310, the content editing entity 330, and the information recording medium manufacturing entity 350.

Content 303 before editing is sent to the content editing entity 330. after an encoding process (step S12) is performed on MPEG data or the like using an encoder and an editing process (step S13) is performed by the authoring system, the content 303 before editing becomes content 331 after editing.

When performing the editing process (step S13) by the authoring system, copy limitation information corresponding to the content, CCI information (copy/play control information) 332 that is playback limitation information, and a recording seed Vu333 used for encrypting content are also generated. The recording seed 333, as described above, can be set for each CPS unit. When the content 331 after editing has a plurality of content management units (CPS units), the recording seeds Vu333 are generated for the number of CPS units. The value of the recording seed Vu333 is, for example, a random number having a length of 128 bits. The CCI information 332 can be set variously, for example, it is set as information for each CPS unit and it is set so as to correspond to a plurality of CPS units. The content 331 after editing shown in the figure contains the CCI information and the recording seed Vu, and the content 331 after editing is sent to the information recording medium manufacturing entity 350.

The information recording medium manufacturing entity 350 obtains information (management information) necessary for encrypting content from the management center 310.

The management center 310 generates a media key Km 311, performs a process (step S11) for generating an EKB serving as an encrypted key block, in which the media key Km 311 is stored as encrypted data, thereby generating an EKB 312.

As described above, the EKB 312 has stored therein encrypted data that can be decrypted by only a decryption process using a device key stored in the reproduction apparatus that holds a license as a valid content use right. it is possible for only the reproduction apparatus holding a license as a valid content using right to obtain the media key Km.

The management center 310 sends management information containing the EKB 312 in which the media key Km is stored and the media key Km 311 to the information recording medium manufacturing entity 350.

The information recording medium manufacturing entity 350 receiving these pieces of information encrypts the content in the following procedure.

Initially, in step S14, a unit key generation key Ke (Embedded Key), which is a key that is the generation source of the unit key corresponding to the CPS unit, is generated. the unit key generation key Ke (Embedded Key) is generated by an encryption process (for example, an AES encryption process) using the media key Km obtained from the management center 310 and the physical index Ve 351 that is securely generated within the information recording medium manufacturing entity 350.

Furthermore, in step S15, a hash value (content hash) for the edited content obtained from the content editing entity 330 is generated. The hash value to be generated is a hash value that is generated on the basis of the data forming the CPS unit or on the basis of part of the data. For the hash generation process, for example, a hash value generation process using, for example, an AES-based hash function, is performed.

In step S16, by using a content hash, a unit key generation key Ke (Embedded Key), CCI information obtained from the content editing entity 330, and a recording seed Vu, a unit key Ku used for encrypting content is generated. this process for generating the unit key Ku is also performed by, for example, an AES encryption process.

As described above, the content stored on the information recording medium is divided in content management units (CPS units), and the recording seed Vu is set for each CPS unit. For example, when n CPS units 1 to n are set so as to correspond to the content stored on the information recording medium, recording seeds Vu1 to Vun are generated, and these are provided from the content editing entity 330 to the information recording medium manufacturing entity 350.

The information recording medium manufacturing entity 350 generates n unit keys Ku1 to Kun by sequentially using the unit key generation key Ke (Embedded Key), the content hash generated on the basis of the edited content obtained from the content editing entity 330, CCI information, and n recording seeds Vu1 to Vun, respectively. The recording seeds Vu1 to Vun have different values corresponding to the content (CPS unit), and the generated unit keys Ku1 to Kun also have mutually different key data.

Next, in step S17, the information recording medium manufacturing entity 350 encrypts edited content provided from the content editing entity 330 to the information recording medium manufacturing entity 350. that is, encryption using the corresponding unit key Ku1 to Kun is performed for each CPS unit, and encrypted content is generated. the content may be encrypted by directly using the unit key. In addition, it is more preferable that the content is divided in block units, block keys in block units are generated, and the content is encrypted and recorded. An example of the encryption using the block key will be described later.

In step S18, the information recording medium manufacturing entity 350 performs a formatting process for setting the physical index information 351, information to be recorded in the lead-in area, EKB, and the like to a predetermined recording format, and finally records all the information described in FIG. 1 on the information recording medium 100. The recording data contains encrypted content encrypted using the unit key, and a content hash. The encrypted content contains the CCI information and recording seeds, and some of the encrypted content may be formed as non-encrypted data. A specific content structure will be described later. Furthermore, examples of processes using AES encryption as specific examples of various kinds of key generation processes to be performed by the information recording medium manufacturing entity 350 will be described in detail later.

Next, a description will be given, with reference to FIG. 6, of an example of a process in which a content hash is not used to generate unit keys Ku1 to Kun. Processes by the management center 310 and the content editing entity 330 are identical to the processes described with reference to FIG. 5, and accordingly, descriptions thereof are omitted. The information recording medium manufacturing entity 350 encrypts content in the following procedure.

Initially, in step S21, a unit key generation key Ke (Embedded Key), which is a key that is the generation source of the unit key corresponding to the CPS unit is generated. the unit key generation key Ke (Embedded Key) is generated by an encryption process (for example, an AES encryption process) using the media key Km obtained from the management center 310 and the physical index Ve 351 that is securely generated within the information recording medium manufacturing entity 350.

In step S22, the unit key Ku used for encrypting content is generated using the unit key generation key Ke (Embedded Key), the CCI information, and the recording seed Vu obtained from the content editing entity 330. This unit key Ku generation process is also performed by, for example, an AES encryption process. in this example, the content hash is not used as unit key generation information.

The information recording medium manufacturing entity 350 generates unit keys Ku1 to Kun by sequentially using the unit key generation key Ke (Embedded Key), the CCI information obtained from the content editing entity 330, and n recording seeds Vu1 to Vun, respectively. The recording seeds Vu1 to Vun have different values corresponding to the content (CPS unit), and the generated unit keys Ku1 to Kun are mutually different key data.

In step S23, the edited content provided from the content editing entity 330 to the information recording medium manufacturing entity 350 is encrypted. that is, encryption using the corresponding unit key Ku1 to Kun is performed for each CPS unit, and thus encrypted content is generated.

In step S24, a hash value (content hash) is generated on the basis of the encrypted content. The content hash to be generated is generated on the basis of the encrypted content unlike the previous example described with reference to FIG. 5. For the hash generation process, for example, an AES-based hash function is used.

Next, in step S25, the information recording medium manufacturing entity 350 performs a process for formatting each of the data, such as the physical index information 351, information to be recorded in the lead-in area, an EKB, and the like, to a predetermined recording format, and finally records the entire information described in FIG. 1 on the information recording medium 100. The recording data contains encrypted content encrypted using the unit key and a content hash. The encrypted content contains the CCI information and recording seeds, and some of the encrypted content may be formed as non-encrypted data.

Figure 6:
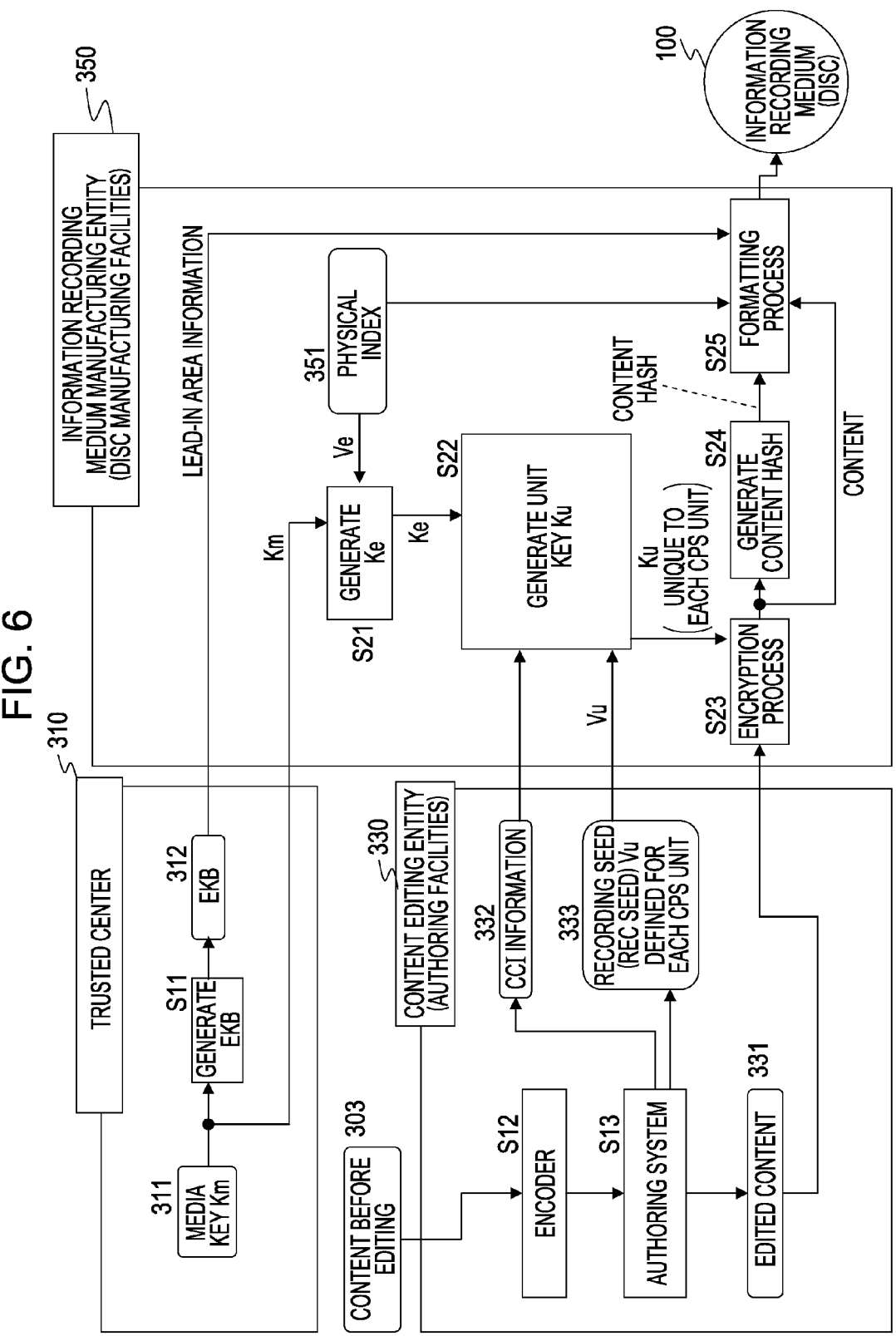
FIG. 6 illustrates an example of processing to be performed by the management center, the content editing entity, and the information recording medium manufacturing entity.

The examples of the processes described with reference to FIGS. 4 to 6 are examples of the processes for providing management information from the management center, that is, the media key Km and the EKB, to the information recording medium manufacturing entity. Next, a description will be given, with reference to FIGS. 7 to 9, of an example of a process for providing management information from the management center, that is, a media key Km and an EKB, to the content editing entity.

Figure 7:
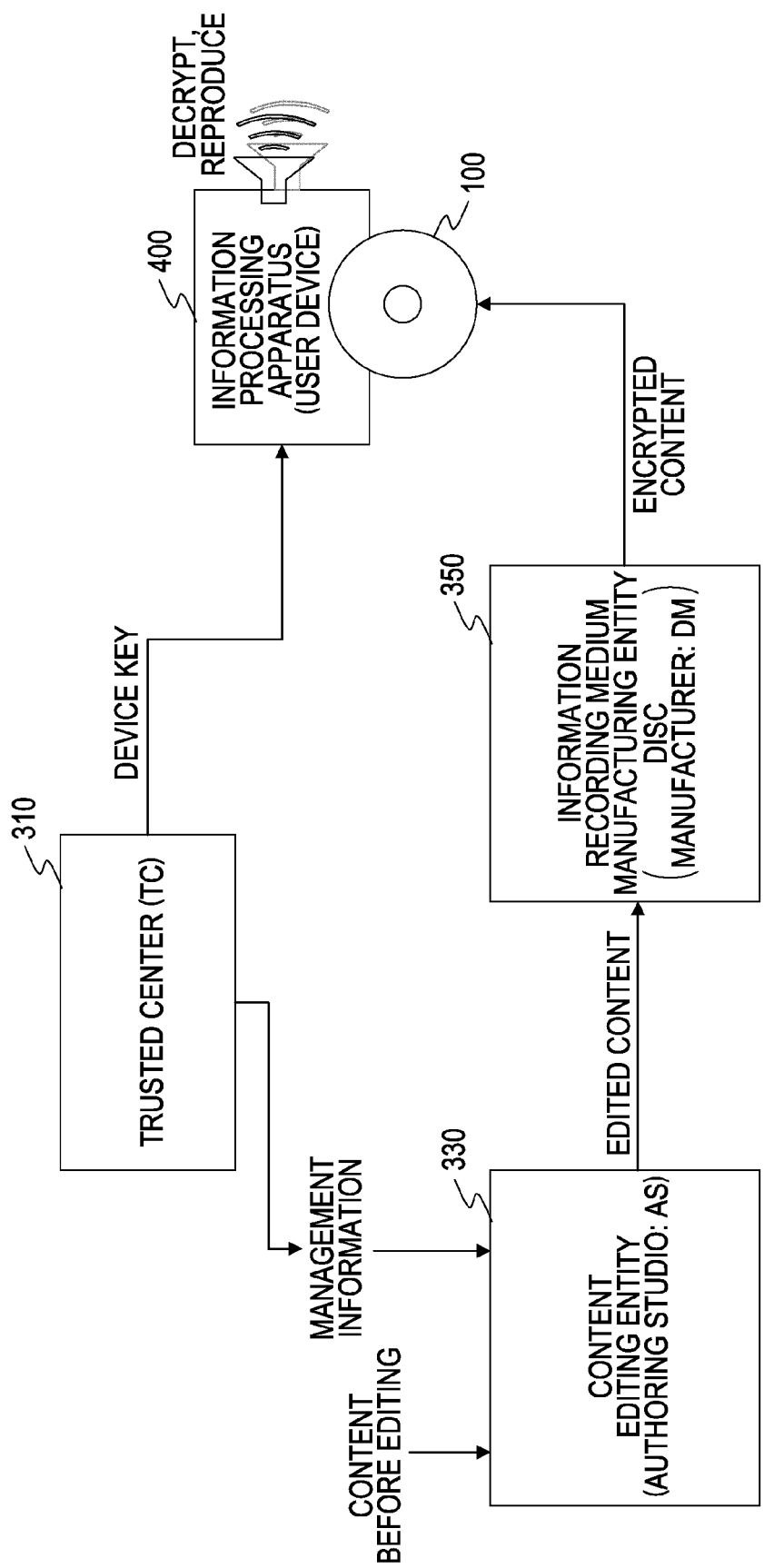
FIG. 7 illustrates an example of processing in a step of manufacturing an information recording medium and information management structure.

FIG. 7 shows the flow of information in an example of a process for providing management information from the management center, that is, a media key Km and an EKB, to the content editing entity. The content to be stored on the information recording medium is edited by the content editing entity (AS: Authoring Studio) 330. Thereafter, in the information recording medium manufacturing entity (DM: Disc Manufacturer) 350, for example, CDs, DVDs, Blu-ray discs, and the like are replicated in large volumes, and the information recording medium 100 is manufactured and provided to the user. The information recording medium 100 is reproduced in an apparatus (information processing apparatus) 400 of the user.

The management center (TC: Trusted Center) 310 performs management for the entire processing of manufacturing, selling, and using discs. in this embodiment, the management center (TC: Trusted Center) 310 provides, to the content editing entity (AS: Authoring Studio) 330, various management information, for example, a media key Km that is set so as to correspond to a medium (information recording medium) and an EKB serving as an encrypted key block in which the media key Km is stored as encrypted data. On the basis of the management information received from the management center (TC: Trusted Center) 310, the content editing entity (AS: Authoring Studio) 330 performs a process for editing content and provides the content to the information recording medium manufacturing entity (DM: Disc Manufacturer) 350. The information recording medium manufacturing entity (DM: Disc Manufacturer) 350 encrypts the content received from the content editing entity (AS: Authoring Studio) 330, generates key information, and stores it. Furthermore, the management center (TC: Trusted Center) 310 manages and provides a device key to be stored in the information processing apparatus 400 of the user.

A description will now be given, with reference to FIGS. 8 and 9, of examples of two processes to be performed by the management center 310, the content editing entity 330, and the information recording medium manufacturing entity 350.

Figure 8:
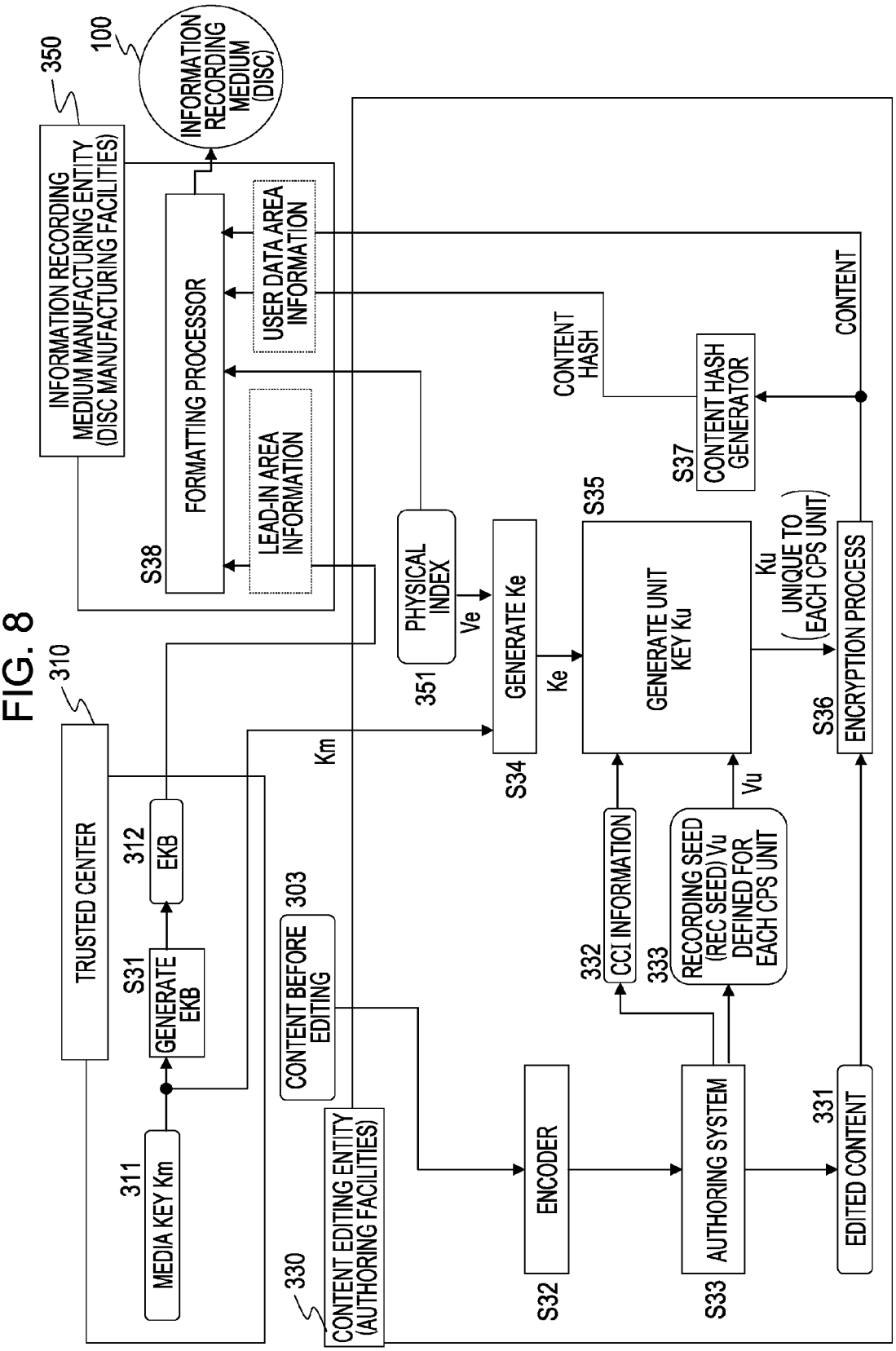
FIG. 8 illustrates an example of processing to be performed by the management center, the content editing entity, and the information recording medium manufacturing entity.

FIG. 8 shows an example of one process to be performed by the management center 310, the content editing entity 330, and the information recording medium manufacturing entity 350, and also shows an example in which content is encrypted and a content hash generation process is performed in the content editing entity 330.

The content 303 before editing is sent to the content editing entity 330. After an encoding process (step S32) using an encoder is performed on MPEG data and the like, and an editing process (step S33) is performed by the authoring system, the content 303 before editing becomes content 331 after editing.

When performing the editing process (step S33) by the authoring system, copy limitation information corresponding to the content, CCI information (copy/play control information) 332 that is playback limitation information, and recording seeds Vu 333 used for encrypting content are also generated. The recording seed 333, as described above, can be set for each CPS unit. When the content 331 after editing has a plurality of content management units (CPS units), the recording seeds Vu 333 are generated for the number of CPS units. The value of the recording seed Vu 333 is, for example, a random number having a length of 128 bits. The CCI information 332 can be set variously, for example, it is set as information for each CPS unit or it is set so as to correspond to a plurality of CPS units.

In this example, in the content editing entity 330, content is encrypted. The content editing entity 330 obtains information (management information) necessary for encrypting content from the management center 310.

The management center 310 generates a media key Km 311, and performs a process (step S11) for generating an EKB serving as an encrypted key block, in which the media key Km 311 is stored as encrypted data, thereby generating an EKB 312. The EKB 312 has stored therein encrypted data that can be decrypted by only a decryption process using a device key stored in the reproduction apparatus holding a license as a valid content using right. It is possible for only the reproduction apparatus holding a license as a valid content using right to obtain a media key Km. The management center 310 sends the management information containing the EKB 312 in which the media key Km is stored and the media key Km 311 to the content editing entity 330.

The content editing entity 330 receiving these pieces of information encrypts content in the following procedure.

Initially, in step S34, a unit key generation key Ke (Embedded Key), which is a key that is the generation source of the unit key corresponding to the CPS unit, is generated. the unit key generation key Ke (Embedded Key) is generated by an encryption process (for example, an AES encryption process) using the media key Km obtained from the management center 310 and a physical index Ve 351 that is securely generated within the content editing entity 330.

In step S35, a unit key Ku used for encrypting content is generated by, for example, an AES encryption process by using the unit key generation key Ke (Embedded Key), the CCI information, and the recording seed Vu.

The content editing entity 330 generates n unit keys Ku1 to Kun by sequentially using the unit key generation key Ke (Embedded Key), the CCI information, and n recording seeds Vu1 to Vun, respectively.

Next, in step S36, the edited content is encrypted. That is, encryption using the corresponding unit keys Ku1 to Kun is performed for each CPS unit, and thus encrypted content is generated. In step S37, a hash value (content hash) is generated on the basis of the encrypted content. The content hash to be generated is generated on the basis of the encrypted content. For the hash generation process, for example, an AES-based hash function is used.

Next, the content editing entity 330 provides the encrypted content, the content hash, the physical index, and the EKB received from the management center 310 to the information recording medium manufacturing entity 350. In step S38, the information recording medium manufacturing entity 350 performs a process for formatting various kinds of information received from the content editing entity 330 and records the information on the information recording medium 100. the EKB is recorded in the lead-in area, and the encrypted content and the content hash are recorded in the user data area. The encrypted content contains the CCI information and the recording seeds, and some of the encrypted content may be formed as non-encrypted data.

Figure 9:
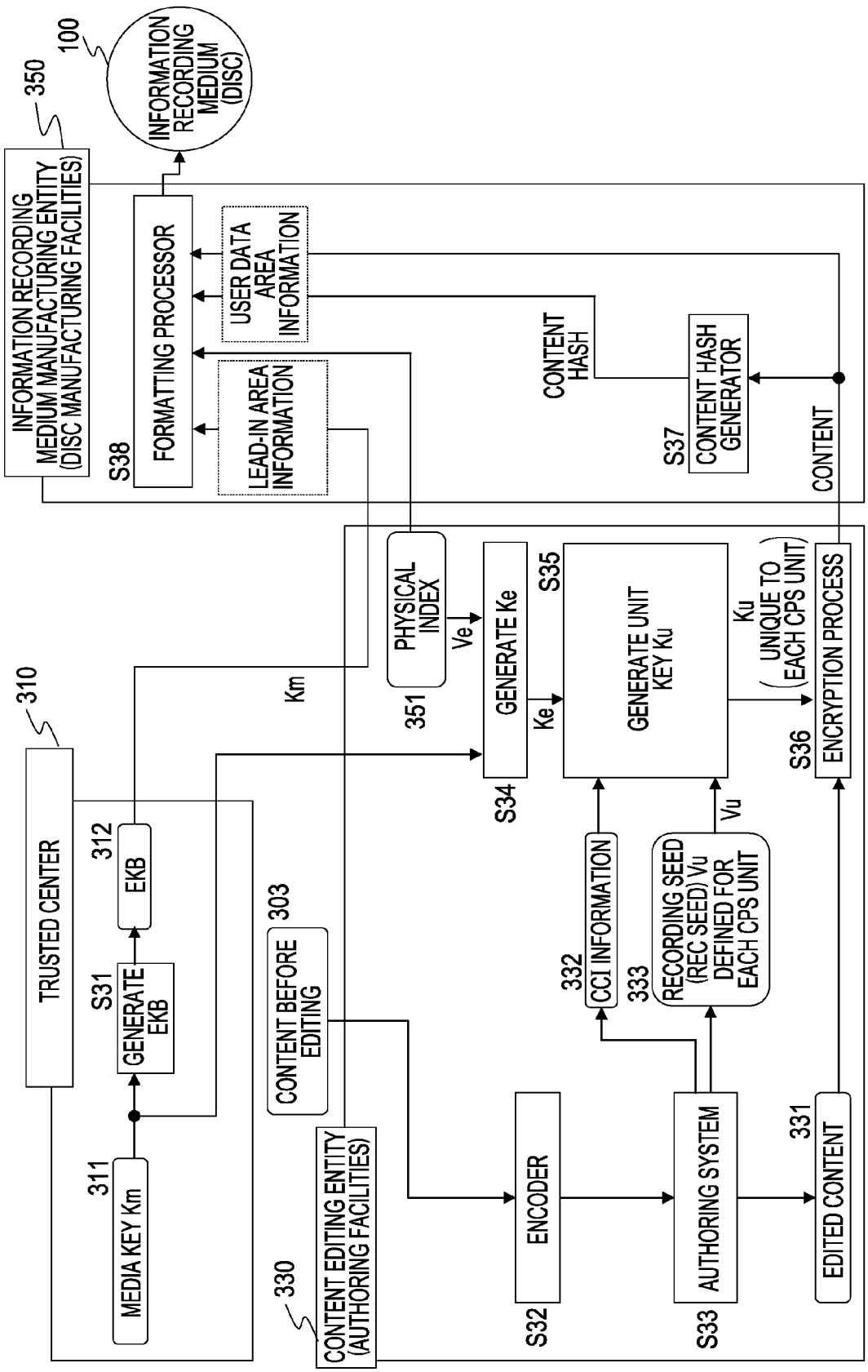
FIG. 9 illustrates an example of processing to be performed by the management center, the content editing entity, and the information recording medium manufacturing entity.

FIG. 9 shows an example of a process in which content is encrypted in the content editing entity 330 and a process for generating a content hash on the basis of encrypted content is performed in the information recording medium manufacturing entity 350.

The processes of step S31 to S36 shown in FIG. 9 are identical to the processes described with reference to FIG. 8, and accordingly, descriptions thereof are omitted. the content editing entity 330 generates n unit keys Ku1 to Kun by sequentially using the unit key generation key Ke (Embedded Key), the CCI information, and n recording seeds Vu1 to Vun, respectively. in step S36, the content editing entity 330 encrypts the edited content by using the unit keys Ku1 to Kun, and then provides the encrypted content, the physical index, and the EKB received from the management center 310 to the information recording medium manufacturing entity 350.

in step S37, on the basis of the encrypted content received from the content editing entity 330, the information recording medium manufacturing entity 350 generates a hash value (content hash). For the hash generation process, for example, an AES-based hash function is used.

Next, in step S38, the information recording medium manufacturing entity 350 performs a process for formatting various kinds of information received from the content editing entity 330 and the generated content hash, and records the information on the information recording medium 100. The EKB is recorded in the lead-in area, and the encrypted content and the content hash are recorded in the user data area. The encrypted content contains CCI information and recording seeds, and some of the encrypted content may be formed as non-encrypted data.

[4. Content Reproduction Process in the Information Processing Apparatus]

A description will be given next of details of a content reproduction process in the information processing apparatus for performing the above-described reproduction process for an information recording medium on which encrypted content in which encryption in CPS units has been performed and various kinds of information are stored.

Figure 10:
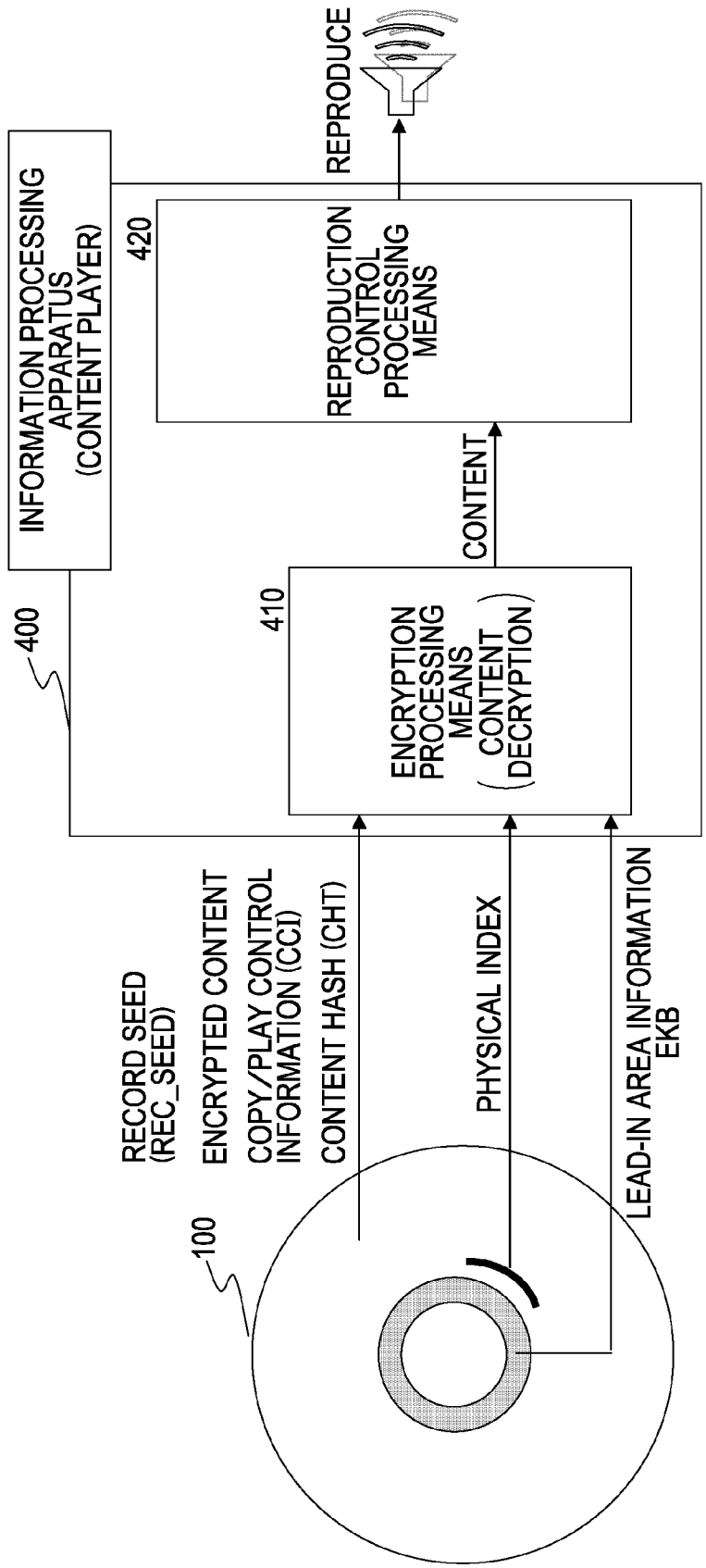
FIG. 10 illustrates the outline of content reproduction in the information processing apparatus.

As shown in FIG. 10, the content reproduction in the information processing apparatus 400 includes two steps of a process for decrypting encrypted content in the encryption processing means 410 and a reproduction control process in the reproduction control means 420.

Various kinds of information are read from the information recording medium 100. A process for decrypting encrypted content is performed in the encryption processing means 410. The decrypted content is passed to the reproduction control means 420, and a reproduction condition determination process is performed. Only when the reproduction conditions are satisfied, the content reproduction is performed continuously. When the reproduction conditions are not satisfied, the content reproduction is stopped.

First, details of a process for decrypting encrypted content in the encryption processing means 410 will be described with reference to FIG. 11.

In the content decryption process, first, the encryption processing means 410 reads a device key 411 stored in a memory. the device key 411 is a secret key stored in the information processing apparatus under a license for content use.

Next, in step S41, the encryption processing means 410 performs a process for decrypting an EKB 401 that is an encrypted key block in which a media key Km stored on the information recording medium 100 is stored using the device key 411, and thus obtains a media key Km.

Figure 15:
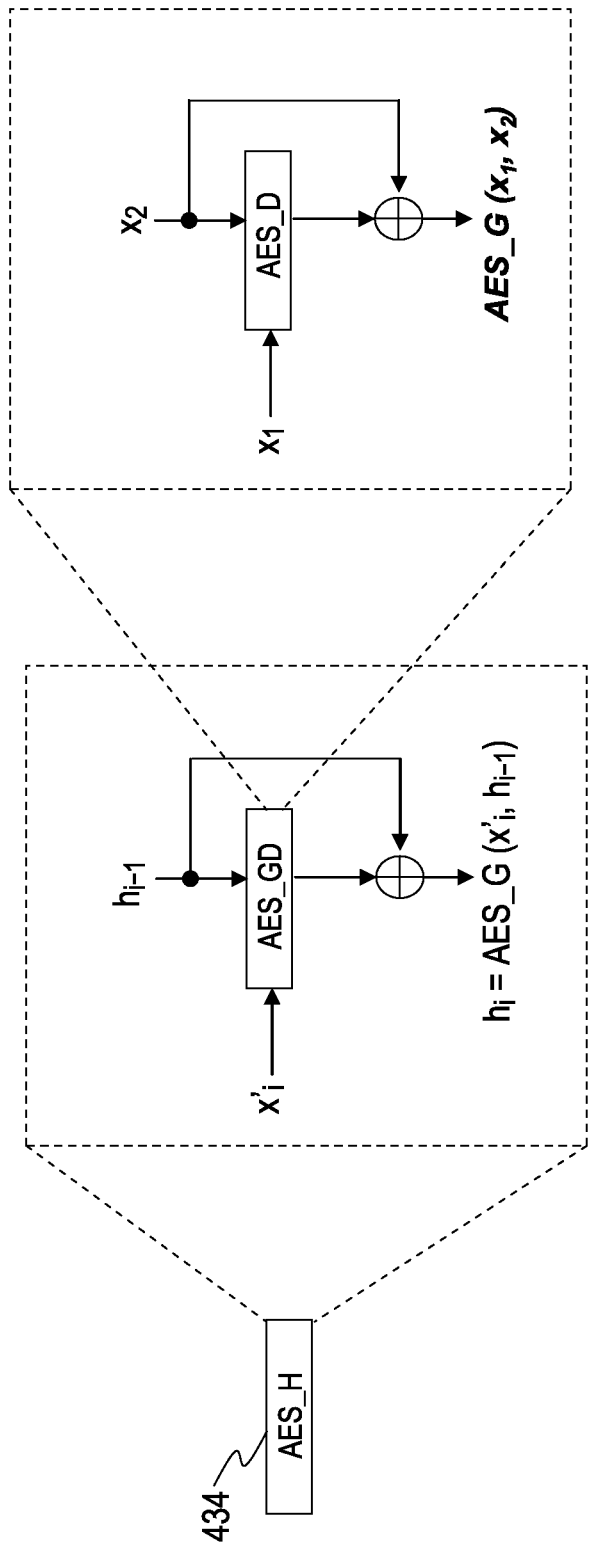
FIG. 15 illustrates a hash function used when content is to be reproduced in the information processing apparatus.

Next, in step S42, a unit key generation key Ke (embedded Key) is generated by an encryption process (AES_H) based on the media key Km obtained by The EKB process in step S41 and the physical index 402 read from the information recording medium 100. The key generation process is performed as a process in accordance with, for example, an AES encryption algorithm. In FIG. 11, AES_D is a data decryption process using an AES encryption process, and AES_H is an AES-based hash function. as shown in FIG. 15, the specific configuration thereof is constructed of a combination of a key generation processing execution section (AES_GD) involving a data decryption process using an AES encryption process and an exclusive OR section. The AES_GD section is constructed of a combination of an AES decryption part and an exclusive OR section, as shown in FIG. 15. the content hash to be recorded on the information recording medium, described previously with reference to FIGS. 5, 6, 8, and 9, can also be generated by using a hash computation section 434 similarly to that shown in FIG. 15. Either one of two input values for AES_H may be assigned to inputs indicated in FIG. 15. For example, in the case of part (b) of FIG. 12, there can be two cases in which X is Ke and h is CCI, and X is CCI and h is Ke. In an actual recording and reproduction apparatus, how the value should be assigned is selected, and the process is performed. AES_GE indicates a key generation process involving a data encryption process using an AES encryption process.

Next, in step S43, a control key Kc is generated by an encryption process (AES_H) on the basis of a unit key generation key Ke (embedded Key) and copy/play control information (CCI) 403 read from the information recording medium 100. in step S44, a content hash key Kh is generated by the encryption process (AES_H) on the basis of a control key Kc and a content hash 404 read from the information recording medium 100.

Figure 11:
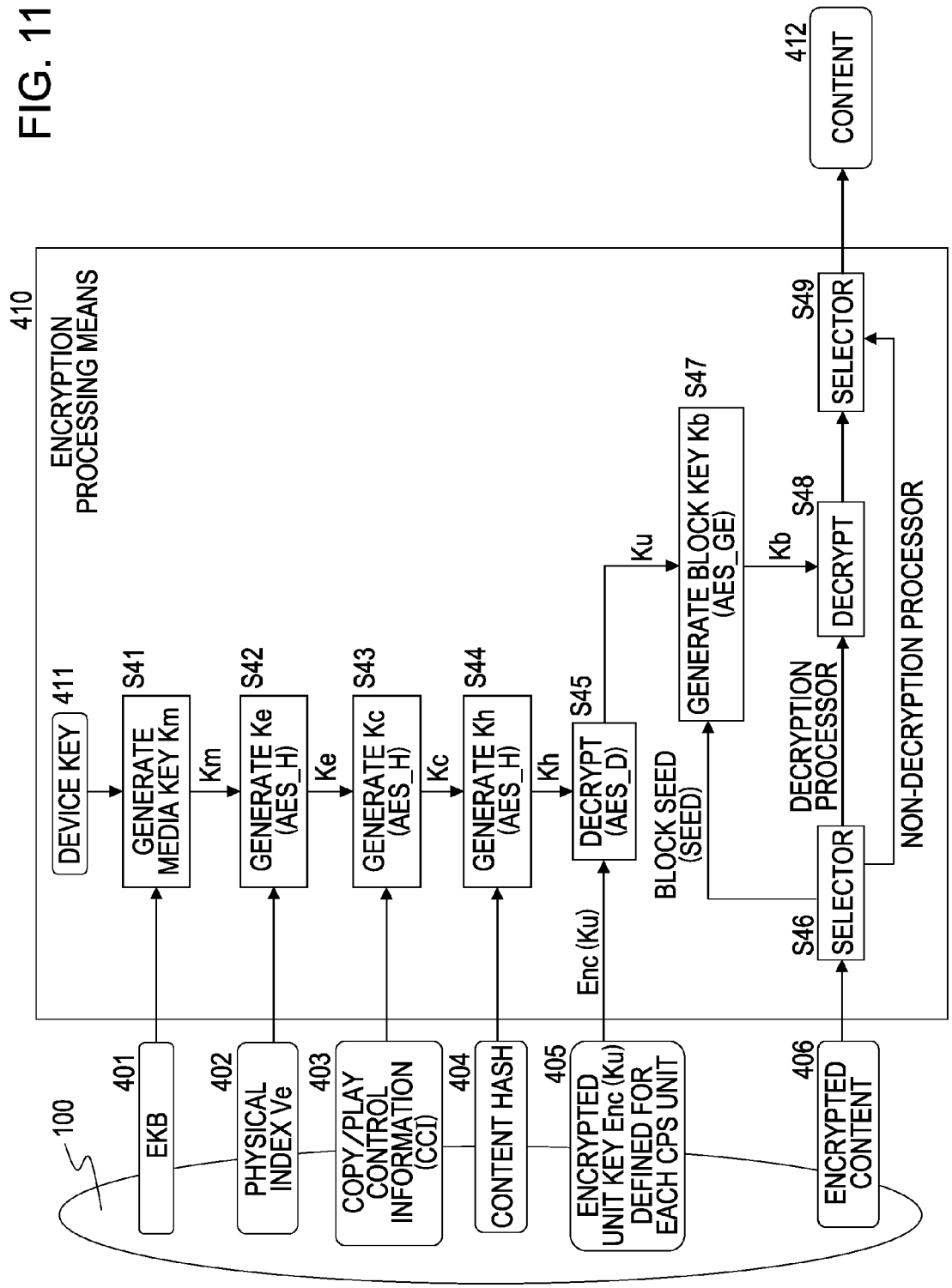
FIG. 11 illustrates a detailed example of an embodiment of content reproduction in the information processing apparatus.

Next, in step S45, an encrypted unit key Enc(Ku) 405 read from the information recording medium 100 is decrypted (AES_D) by using the content hash key Kh, and a unit key Ku is obtained. in this example, the unit key to be stored on the information recording medium 100 is stored as encrypted data using the content hash key Kh generated by processes identical to steps S41 to S44 of FIG. 11.

The encrypted unit key Enc(Ku) 405 recorded on the information recording medium 100 is defined for each CPS unit. The unit key Ku generated in S45 is also similarly defined for each CPS unit. the CPS unit key to be generated is a CPS unit key Ku(i) that is set so as to correspond to the CPS unit corresponding to the content to be reproduced, that is, a CPS unit(i) selected from the CPS units 1 to n stored on the information recording medium 100.

When decrypting the encrypted content, first, in S46, a block seed is extracted from encrypted content 406 read from the information recording medium 100, and data for the decryption processing part (encrypted data) requiring a decryption process and a non-decryption processing part (plain text data) not requiring a decryption process is selected.

The block seed is encryption key generation information that is set so as to correspond to a block serving as an encryption processing unit. content data serving as a CPS unit is subjected to encryption using a block key Kb different in block units of a predetermined data length. for decryption, a block key Kb serving as a decryption process key for each block is generated by an encryption process (S47: AES_GE) on the basis of a block seed that is set so as to correspond to each block data and the CPS unit key Ku. Then, a decryption process (S48) is performed using the generated block key Kb The block key Kb is a key used for decrypting encrypted content in encryption processing units of a specific size. The size of the encryption processing unit is assumed to contain, for example, user data of 6144 bytes or user data of 2048 bytes. The details of the generation of the block key Kb and the decryption process based on the block key Kb will be described later.

Step S49 is a process for coupling non-encrypted data of, for example, a block seed part contained in the encrypted content, and data decrypted in step S48. As a result, decrypted content (CPS unit) 412 is output from the encryption processing means 410 to the reproduction control means 420.

In this example, a content hash is used to generate an encryption key. For the content hash in this case, a content hash generated from content data of a plain text is used. More specifically, for example, the generation is performed as a process for the information recording medium 100 on which data has been recorded, which has been manufactured by the process described previously with reference to FIG. 5.

Figure 12:
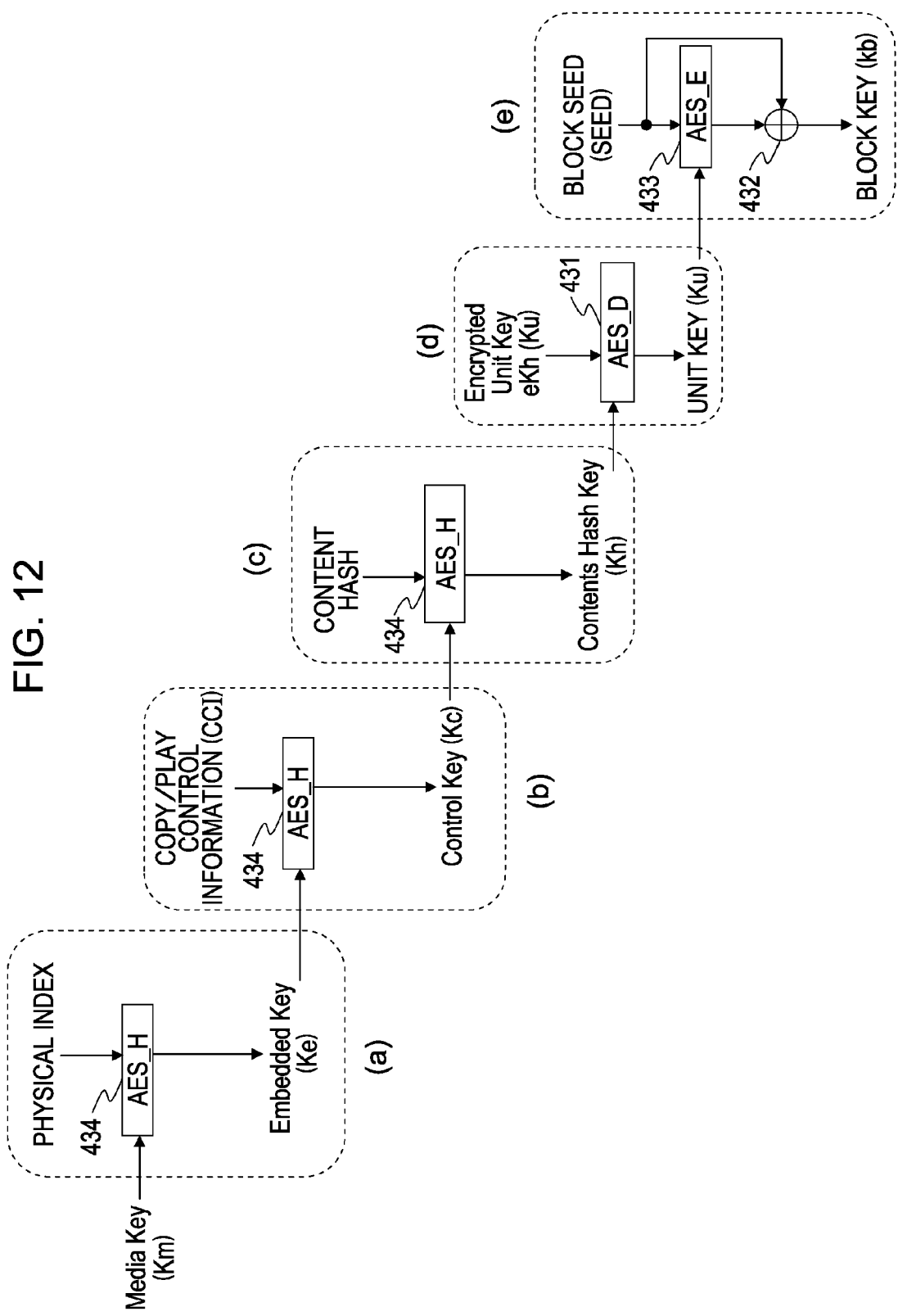
FIG. 12 illustrates details of an encryption process, such as generation of a key used for content reproduction in the information processing apparatus.

Specific examples of an encryption process to be performed in steps S42 to S45, and S47 will be described with reference to FIG. 12. In FIG. 12, an AES decryption part (AES_D) 431 is, for example, a decryption part based on an AES or ECB mode having a key length of 128 bits. An AES decryption part (AES_E) 433 is, for example, an encryption processor based on an AES or ECB mode having a key length of 128 bits. An exclusive OR section 432 represents a computation section for performing an exclusive OR (XOR) process between two bit strings having the same length.

As shown in FIG. 12(a), more specifically, the process (AES_H) for generating a unit key generation key Ke in step S42 of FIG. 11 is performed as a process for inputting the physical index stored on the information recording medium 100 and the media key Km obtained from the EKB to the AES_H process and for setting the value obtained as a result of performing the AES_H process as a unit key generation key Ke.

The generation of the control key Kc in step S43 of FIG. 11 and the generation of the content hash key in step S44 are performed by an AES_H process, as shown in FIGS. 12(b) and 12(c). As shown in FIG. 12(d), the generation of the unit key Ku is performed as a process in which an AES decryptor 431 decrypts an encrypted unit key eKh (Ku) obtained from the information recording medium 100 by using the content hash key Kh. The generation of the block key Kb in step S47 of FIG. 11 is performed by computation by an AES decryptor 431 and an exclusive OR section 432, as shown in FIG. 12(e).

In this embodiment, an example is shown in which, by using an AES encryption algorithm key, data having a key length of 128 bits is generated. However, the algorithm and the key length are not limited to these examples, and another algorithm and another key length can also be used.

Next, a description will be given, with reference to FIG. 13, of other examples of the content reproduction process. The examples shown in FIG. 13 are examples in which a process for generating a unit key generation key Ke (embedded Key) in step S42, a process for generating a control key Kc in step S43, and a process for generating a content hash key Kh in step S44 are performed by using a hash function (HASH) rather than by using an AES encryption process.

Figure 14:
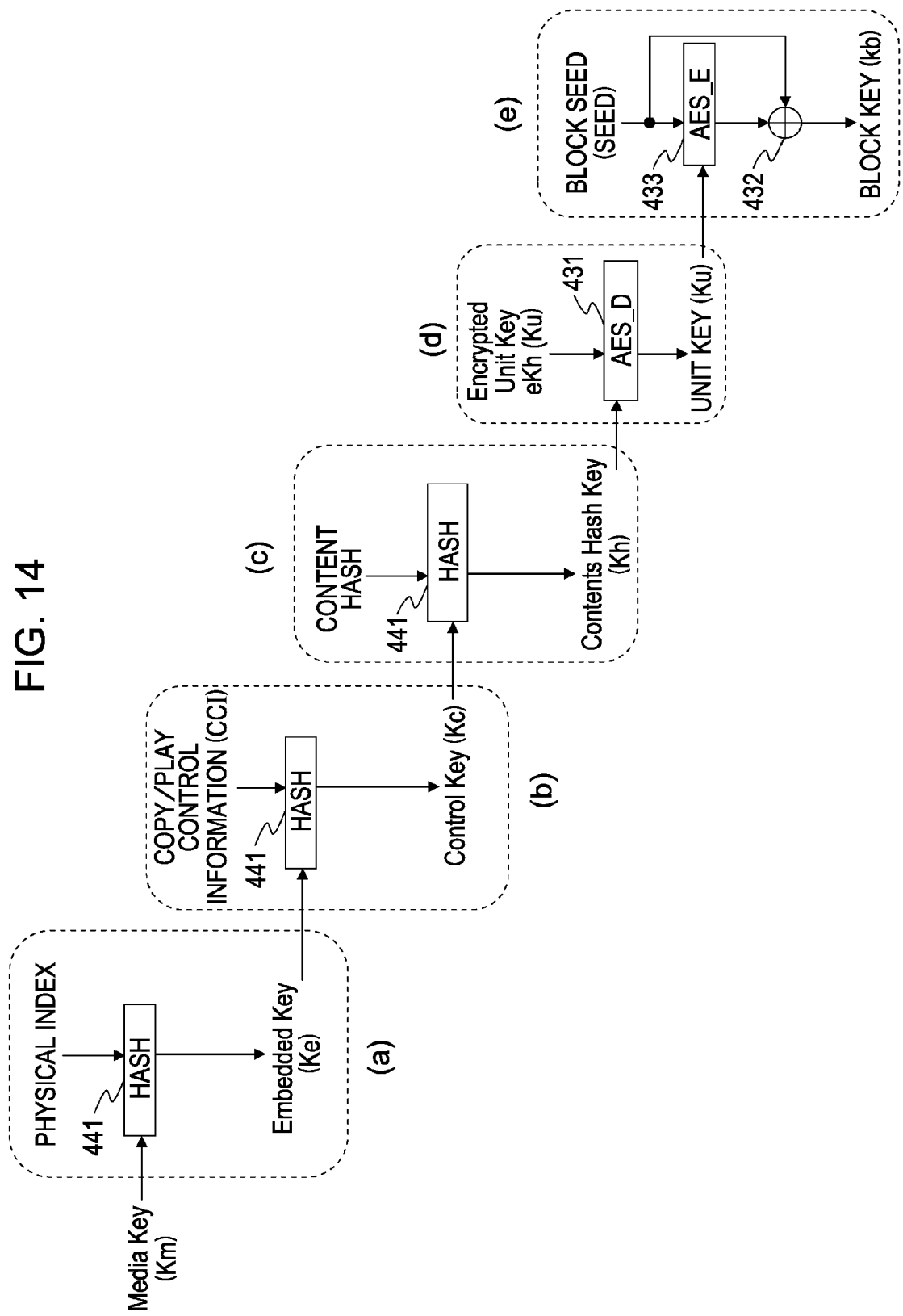
FIG. 14 illustrates details of an encryption process, such as generation of a key used for content reproduction in the information processing apparatus.

A specific configuration of these processes will be described with reference to FIG. 14. In FIG. 14, a hash computation section (HASH) 441 performs a process using a hash function and computes a hash value based on two pieces of input data. The output of the hash computation section (HASH) 441 becomes data of a fixed length with a high level of uniqueness.

The hash computation section (HASH) 441 is, for example, a hash function such as SHA1. When two values are input to a hash function in order to obtain one output, one output can be obtained by successively inputting two input values to a hash function. For example, in the case of FIG. 14(a), by successively inputting a MediaKey(Km) and a physical index to a hash function, an EmbeddedKey(Ke) can be obtained. For this case, regarding which one of the two inputs should be input earlier, there can be two cases of the order of Km to the physical index and the order of the physical index to Km. The description and the usage of the hash function apply the same for FIGS. 14(b) and 14(c).

Figure 13:
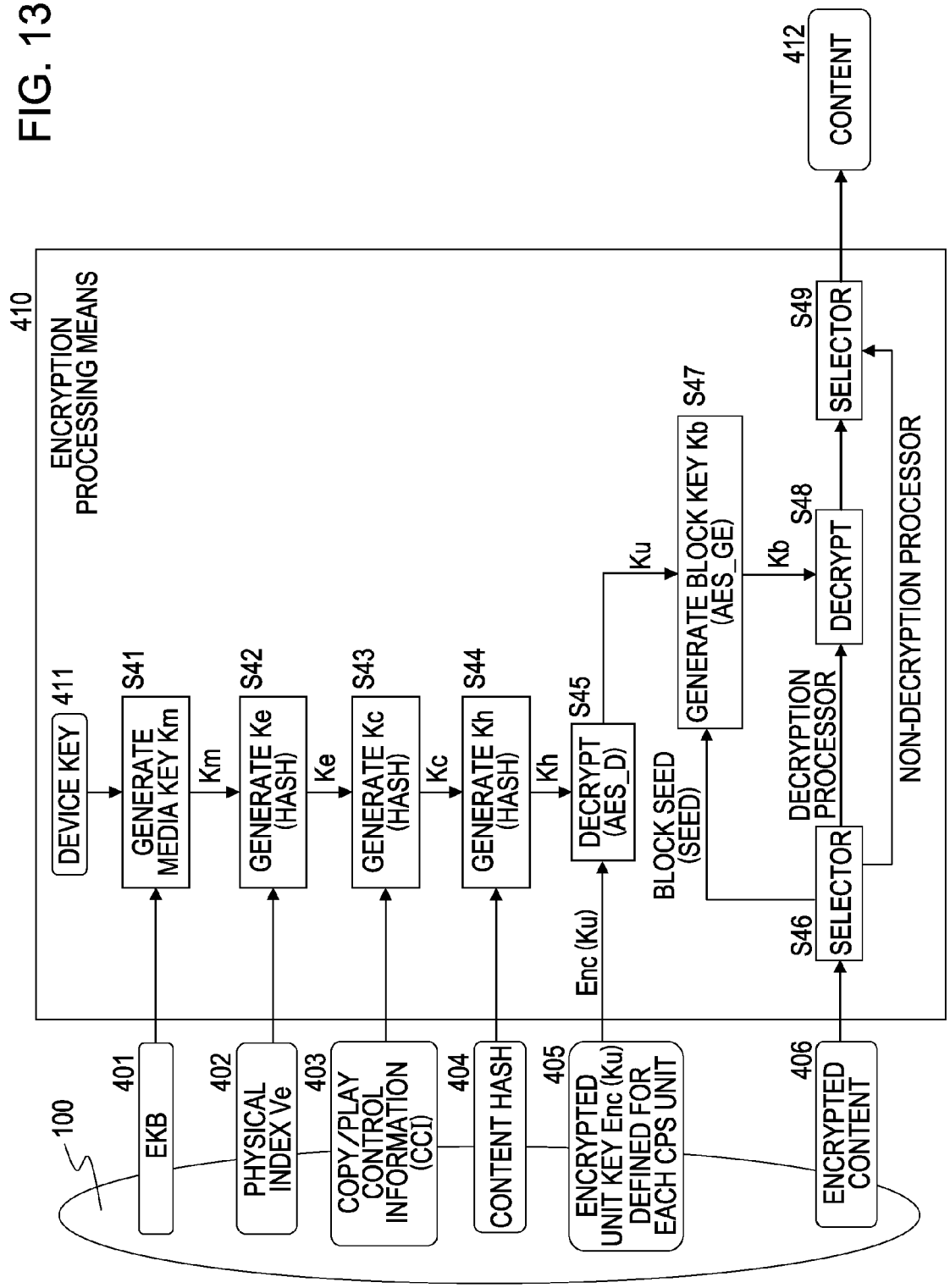
FIG. 13 illustrates a detailed example of an embodiment of content reproduction in the information processing apparatus.

Referring back to FIG. 14, the description of a process for generating various kinds of key data in the content reproduction process is continued. the process for generating the unit key generation key Ke (embedded Key) in step S42 of FIG. 13, the process for generating the control key Kc in step S43, and the process for generating the content hash key Kh in step S44 are performed by using a hash computation section (HASH) 441, as shown in FIGS. 14(a) to 14(c), and the result that is output as a result of a hash computation becomes key data. as shown in FIGS. 14(d) and 14(e), the generation of the unit key in step S45 and the generation of the block key in step S47 are processes identical to the processes described previously with reference to FIGS. 11 and 12.

Figure 16:
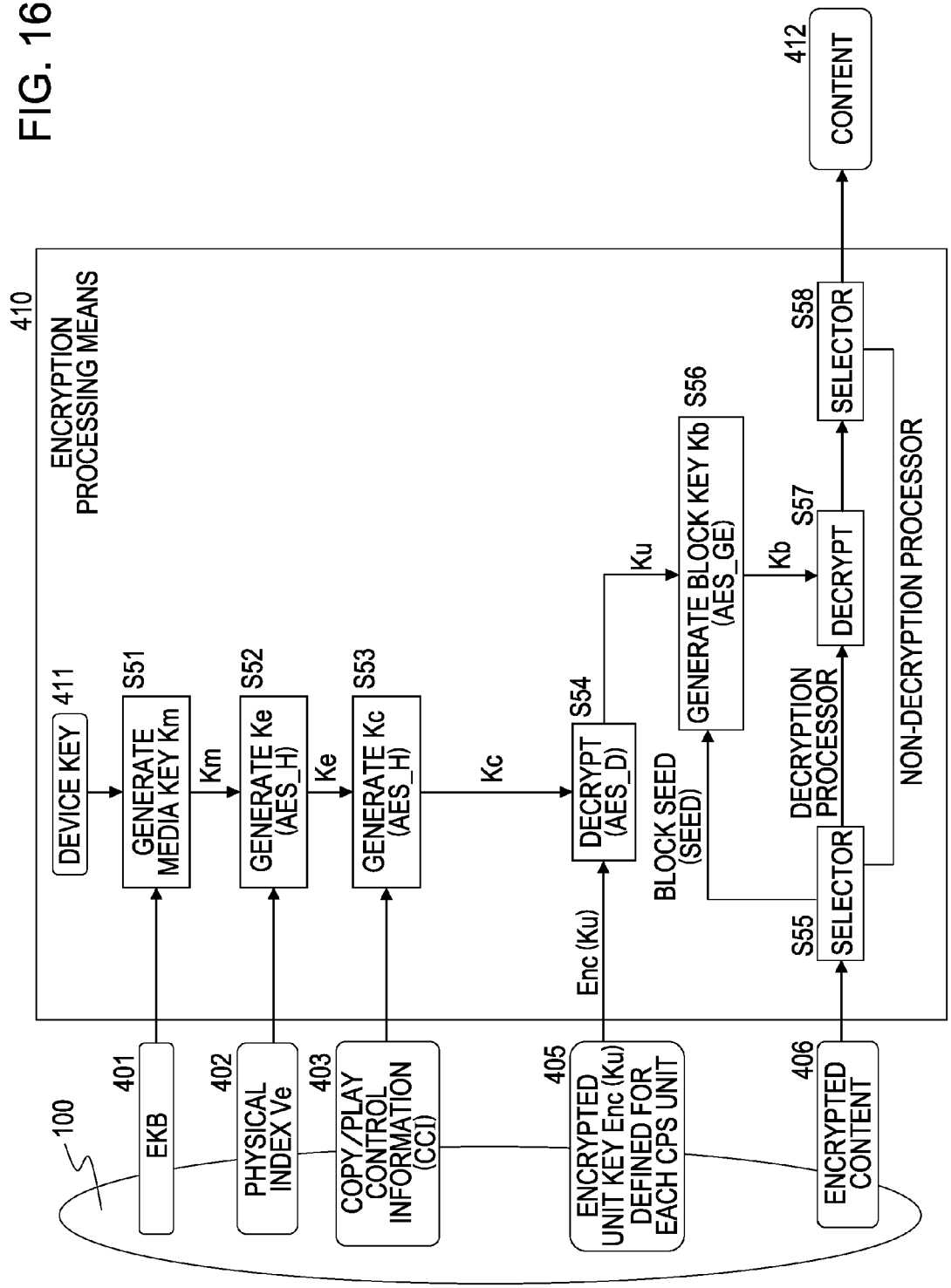
FIG. 16 illustrates a detailed example of an embodiment of content reproduction in the information processing apparatus.

Next, a description will be given, with reference to FIG. 16, of another example of the content reproduction process. The example shown in FIG. 16 shows a process in which a content hash is not used to generate a key. Steps S51 to S53 of FIG. 16 are processes identical to steps S41 to S43 in FIG. 11. In this example, the process of step S44 of FIG. 11 is omitted. that is, on the basis of the control key Kc generated in step S53, in step S54, an encrypted unit key Enc(Ku) read from the information recording medium 100 is decrypted (AES_D) on the basis of the control key Kc without generating a content hash key, and a unit key Ku is obtained. in this example, the unit key to be stored on the information recording medium 100 is stored as encrypted data on the basis of the control key Kc generated by processes identical to steps S51 to S53 of FIG. 16.

The encrypted unit key Enc(Ku) 405 recorded on the information recording medium 100 is defined for each CPS unit. The unit key Ku generated in S54 is also similarly defined for each CPS unit. Ku(i) of the CPS unit key to be generated is a CPS unit key Ku(i) that is set so as to correspond to the CPS unit corresponding to content to be reproduced, that is, the CPS unit(i) selected from the CPS units 1 to n stored on the information recording medium 100. The processes of steps S55 to S58 are performed as processes identical to the processes of steps S46 to S49 in FIG. 11. in this embodiment, a process for generating a content hash key is omitted, and thus the key generation process is simplified.

Figure 17:
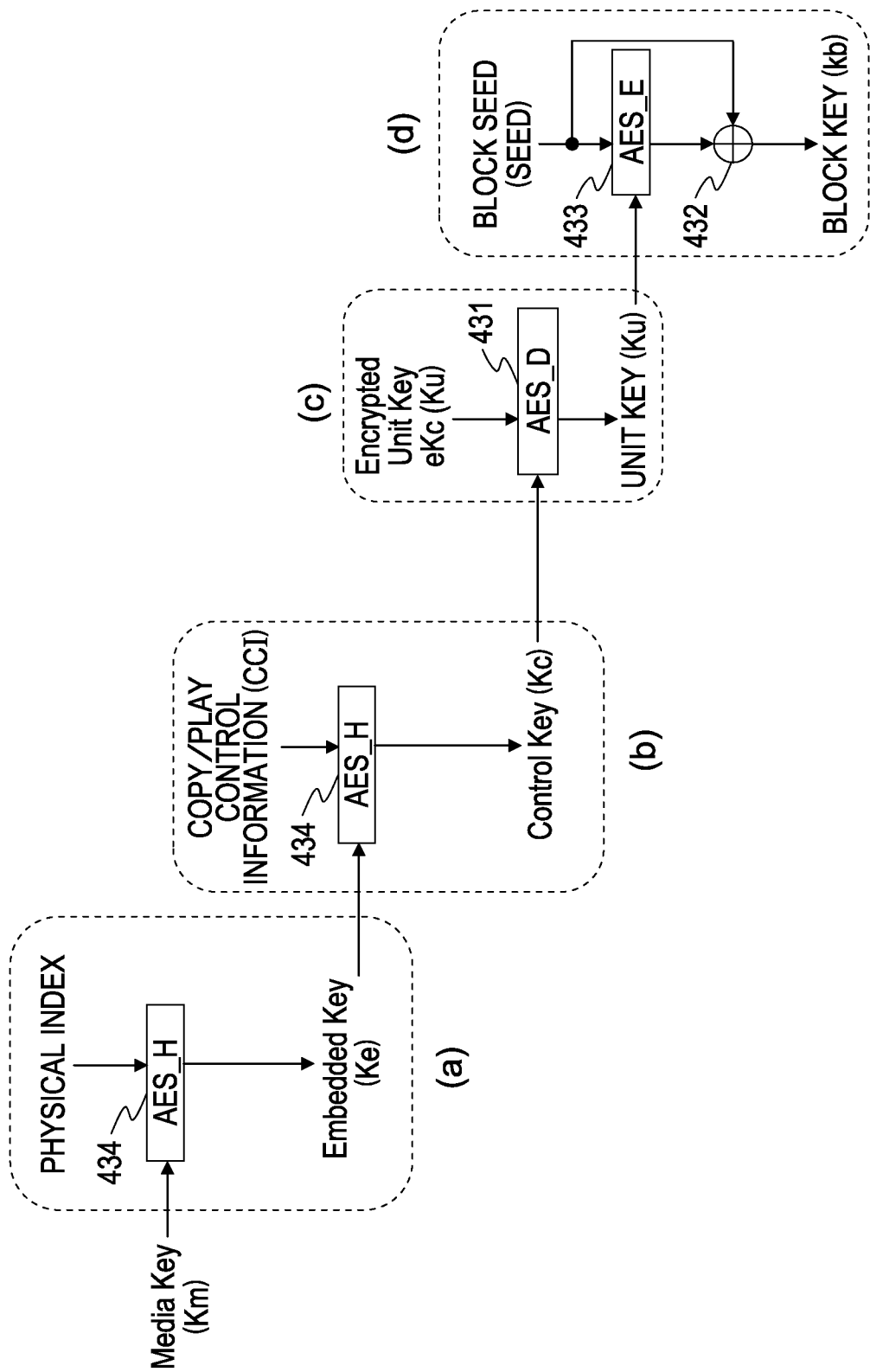
FIG. 17 illustrates details of an encryption process, such as generation of a key used for content reproduction in the information processing apparatus.

The details of key generation processes of steps S51, S52, S53, and S56 of FIG. 16 will be described with reference to FIG. 17. Parts (a) and (b) of FIG. 17 correspond to parts (a) and (b) of FIG. 12, respectively. Parts (c) and (d) of FIG. 17 correspond to parts (d) and (e) of FIG. 12, respectively. the difference of the key generation process shown in FIG. 17 from the processes described with reference to FIGS. 11 and 12 is that an AES decryption process for the encrypted unit key is performed using the control key Kc in the unit key generation process in FIG. 17(c).

Figure 18:
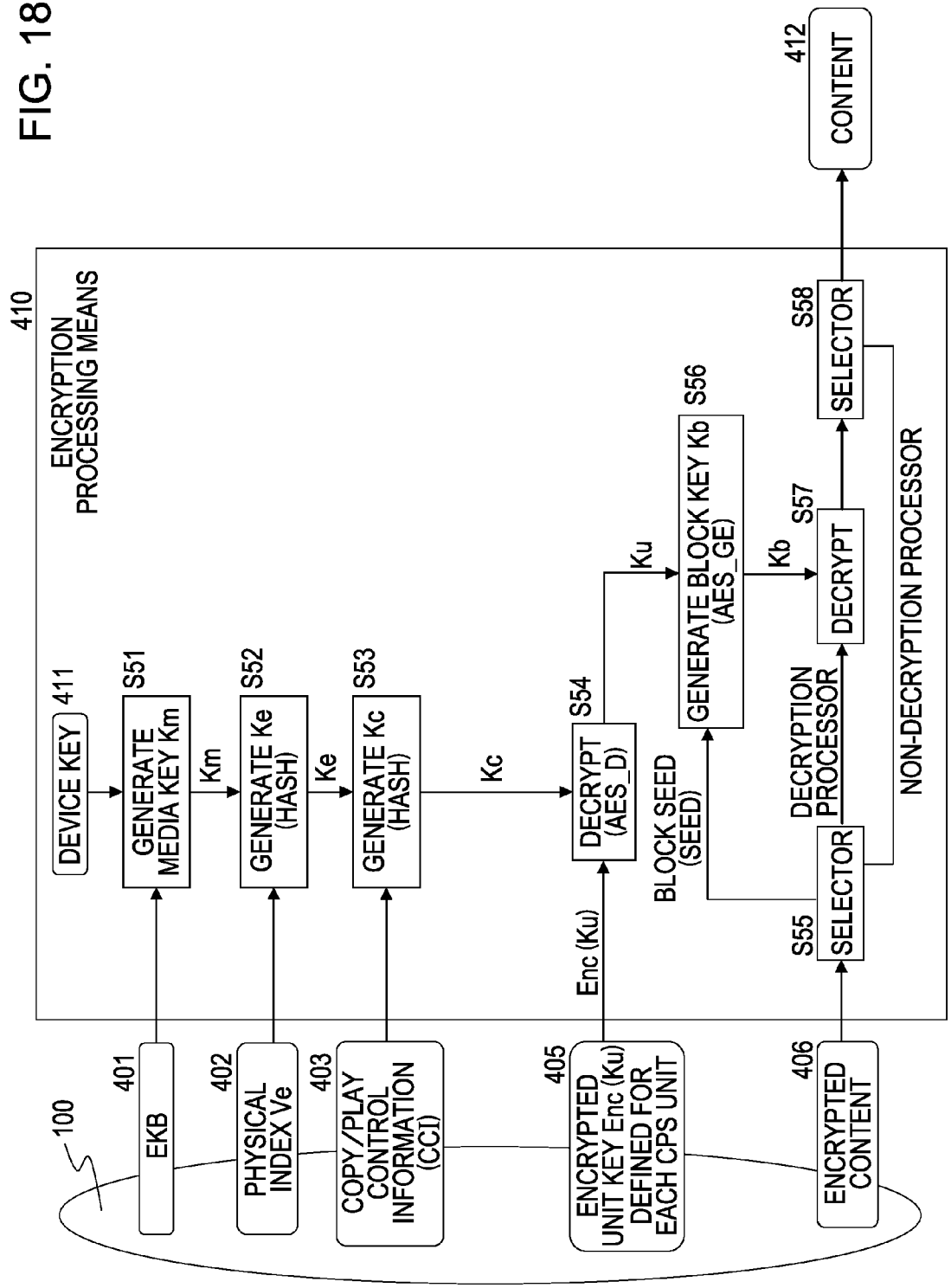
FIG. 18 illustrates a detailed example of an embodiment of content reproduction in the information processing apparatus.

Similarly to FIG. 16, FIG. 18 shows an example of processes in which a content hash is not used to generate a key, that is, a process for generating a unit key generation key Ke (embedded Key) in step S52 and a process for generating a control key Kc in step S53 are performed by using a hash function (HASH) rather than AES encryption shown in FIG. 15.

Figure 19:
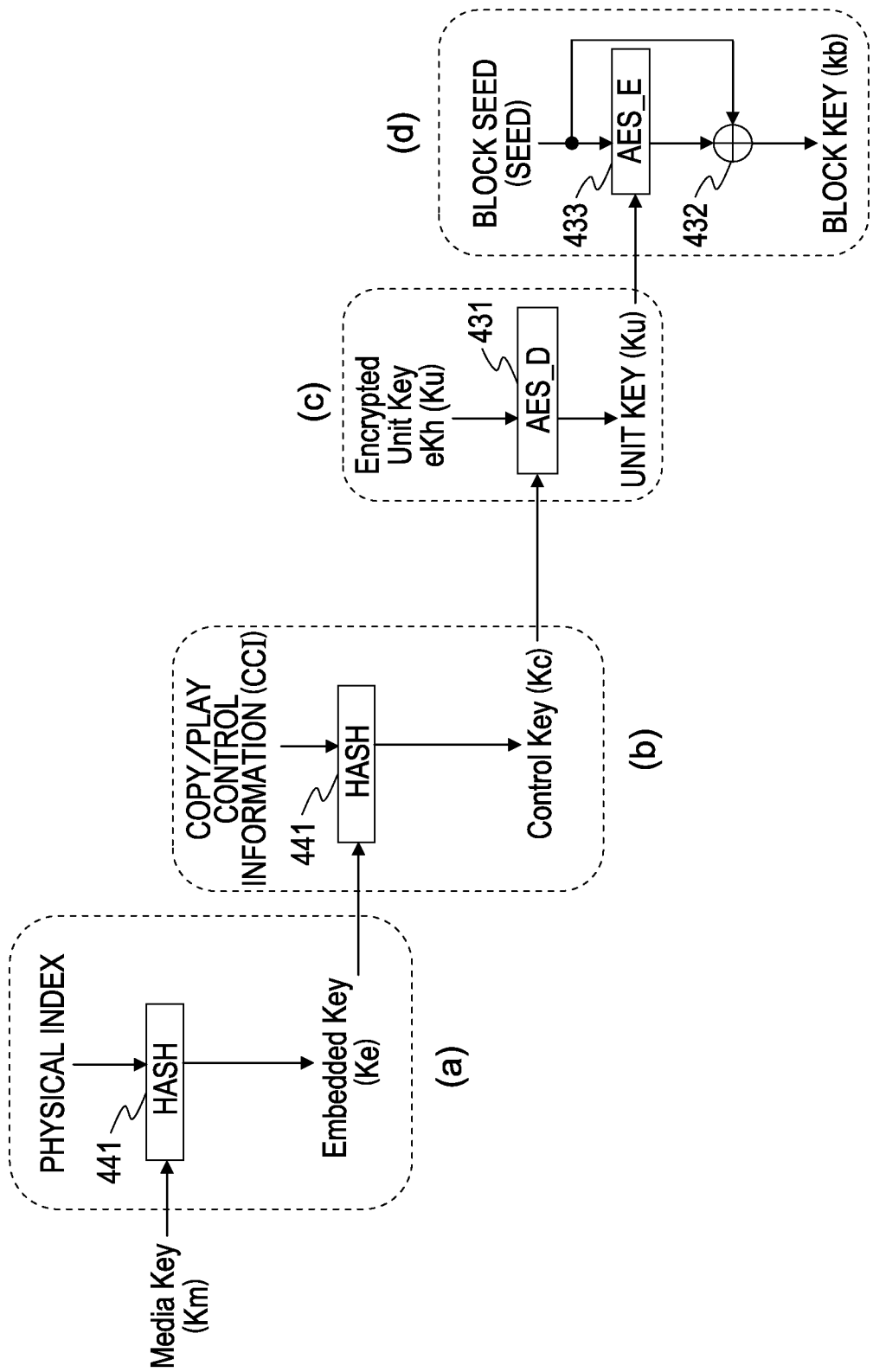
FIG. 19 illustrates details of an encryption process, such as generation of a key used for content reproduction in the information processing apparatus.

A specific configuration of these processes will be described with reference to FIG. 19. In FIG. 19, the hash computation section (HASH) 441 performs a process using a hash function, and computes a hash value based on two pieces of input data. as described above, the output of the hash computation section (HASH) 441 becomes data of a fixed length with a high level of uniqueness. The hash computation section (HASH) 441 is, for example, a hash function such as SHA1.

Parts (a) and (b) of FIG. 19 correspond to parts (a) and (b) of FIG. 14, respectively. Parts (c) and (d) of FIG. 19 correspond to parts (d) and (e) of FIG. 14, respectively. The difference of the key generation process shown in FIG. 19 from the process described with reference to FIGS. 13 and 14 is that, in the unit key generation process of FIG. 19(c), an AES decryption process for the encrypted unit key is performed using the control key Kc.

Another example of the content reproduction process will be described with reference to FIGS. 20 and 21. in the process described previously with reference to FIG. 11, in step S43, the process for generating a control key Kc is performed, and in step S44, the process for generating a content hash key Kh is performed on the basis of the control key Kc. On the other hand, in the example shown in FIG. 20, this order is changed. In step S63, the content hash 404 is read from the information recording medium 100, and a content hash key Kh is generated by a process in accordance with an AES encryption algorithm based on a unit key generation key Ke (embedded Key) generated in step S62 and the content hash 404. Thereafter, in step S64, the copy/play control information (CCI) 403 is read from the information recording medium 100, and a control key Kc is generated by a process in accordance with an AES encryption algorithm based on the content hash key Kh and the copy/play control information (CCI) 403. The remaining processes of steps S61, S62, and S65 to S69 are identical to the process steps S41, S42, and S45 to S49, described with reference to FIG. 11, respectively.

According to this configuration, the content hash key Kh can be generated irrespective of the copy/play control information (CCI) 403. Therefore, there is no need to perform a process for providing a CCI file from the content editing entity to the management center, for generating a content hash key Kh on the basis of the CCI file in the management center, and for providing it to the content editing entity. the management center needs only to issue, to the content editing entity, an EKB, a recording seed Ve, and any content hash key Kh that does not depend on the CCI file, and thus the processing is simplified.

Figure 20:
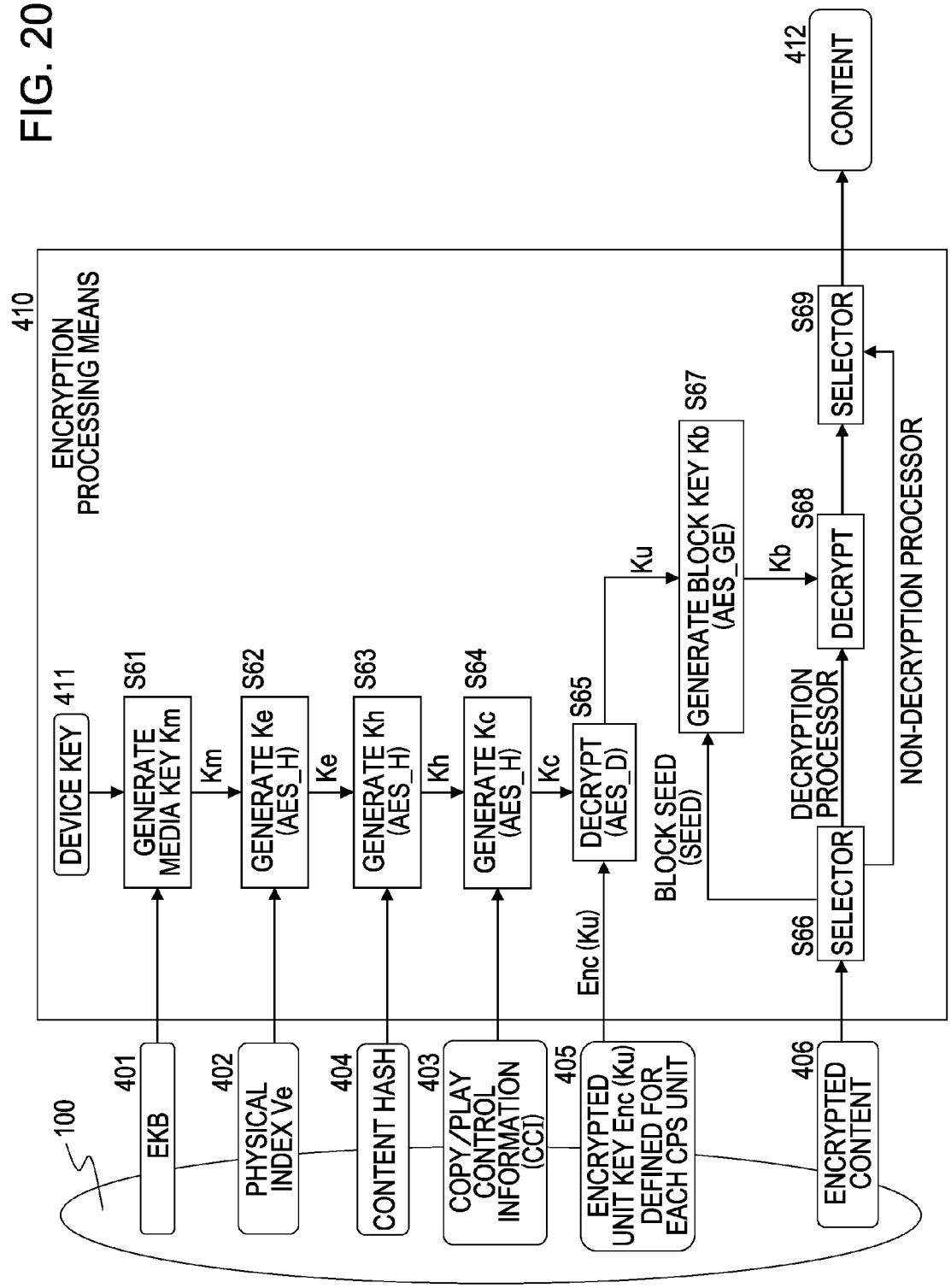
FIG. 20 illustrates a detailed example of an embodiment of content reproduction in the information processing apparatus.
Figure 21:
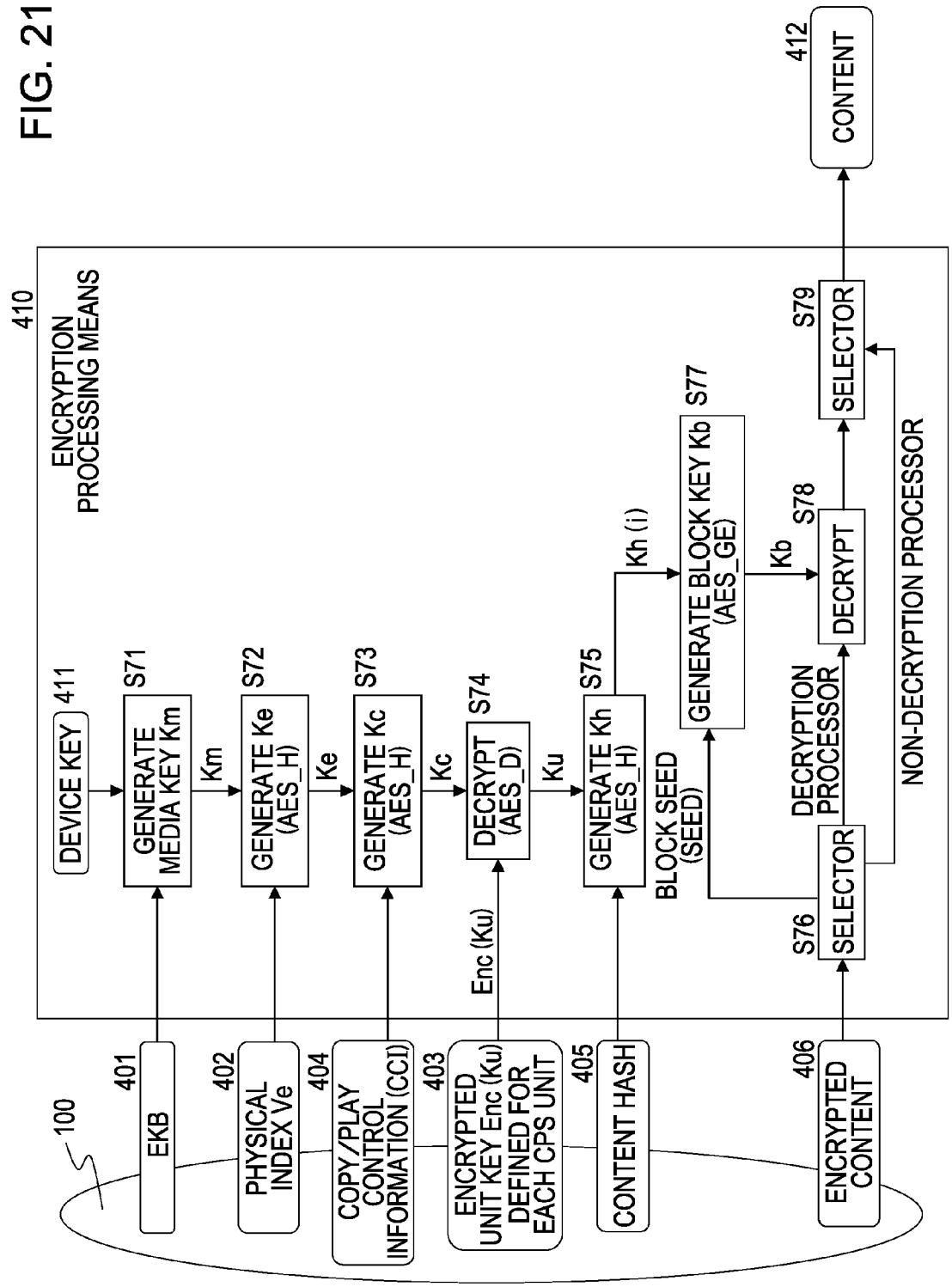
FIG. 21 illustrates a detailed example of an embodiment of content reproduction in the information processing apparatus.

An example of a process shown in FIG. 21 is an example in which, similarly to the process shown in FIG. 20, any content hash key Kh that does not depend on the CCI file can be used, and also, the step of generating the content hash key Kh is delayed, and in step S75, the content hash key Kh is generated by an AES encryption algorithm with the content hash 405 by using the unit key Ku generated in step S74.

As described above, the encrypted unit key Enc(Ku) 405 recorded on the information recording medium 100 is defined for each CPS unit. The unit key Ku generated in S74 is also similarly defined for each CPS unit. Ku(i) of the CPS unit key to be generated is the CPS unit corresponding to the content to be reproduced, that is, the CPS unit key Ku(i) that is set so as to correspond to the CPS unit(i) selected from the CPS units 1 to n stored on the information recording medium 100.

Therefore, the content hash key Kh to be generated in step S75 also becomes a content hash key Kh(i) that is set so as to correspond to the CPS unit(i). In step S77, a block key Kb is generated using the content hash key Kh(i). The remaining processing is identical to the processing described with reference to FIG. 11.

In the example of this configuration, the content hash used to generate the content hash key Kh(i) also becomes a content hash in each CPS unit. Therefore, it becomes necessary to obtain a content hash in a smaller unit. As a result, the effect of preventing content from being tampered is improved.

[Recording Data on an Information Recording Medium, and Details of Content Encryption and Decryption Processes]

Figure 22:
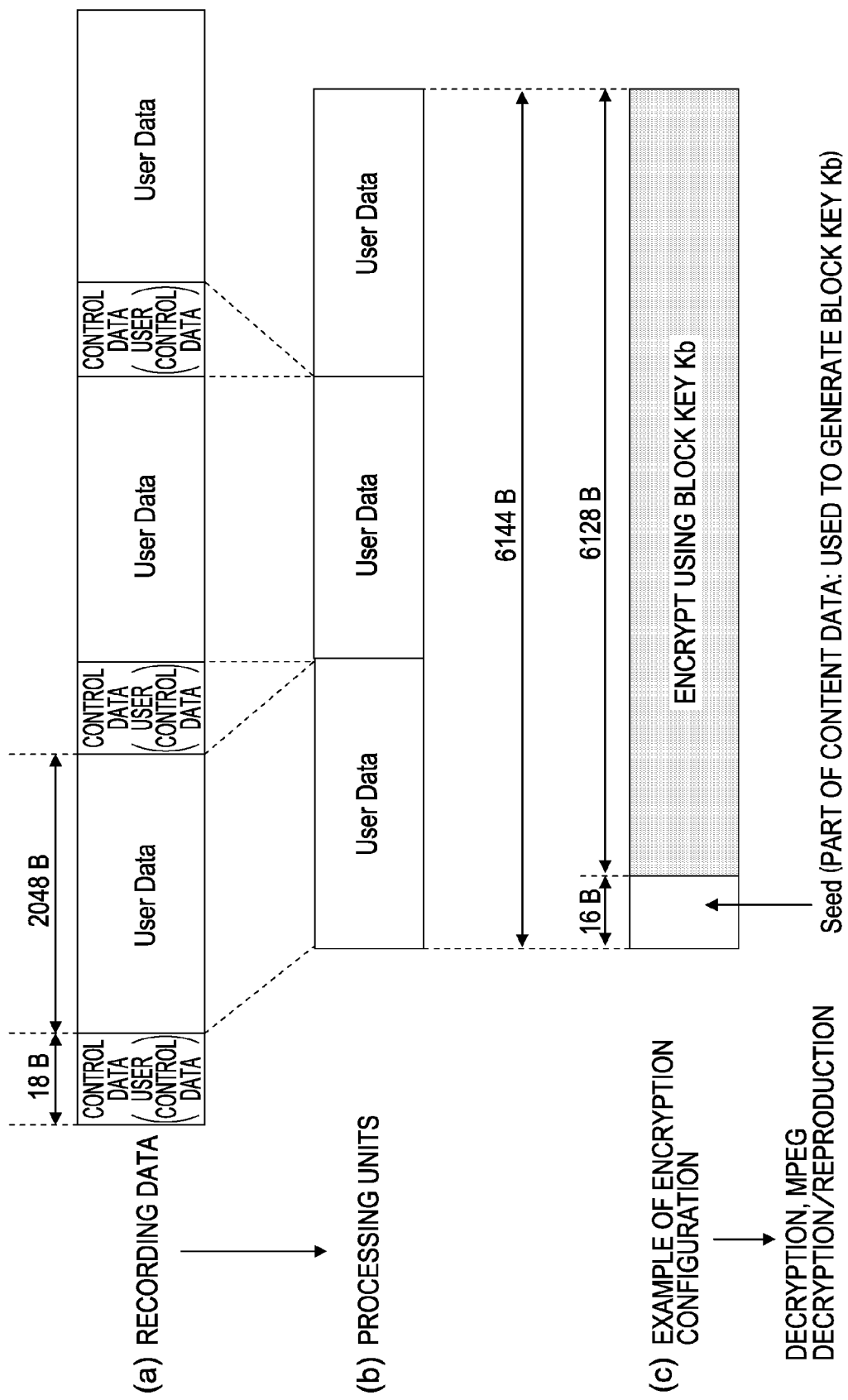
FIG. 22 illustrates the recording structure of data stored on an information recording medium, and the outline of a process for decrypting recording data.

Next, a description will be given of recording data on an information recording medium, and details of content encryption and decryption processes. A description will first be given, with reference to FIG. 22, the recording structure of data to be stored on an information recording medium, and the outline of a process for decrypting recording data. data to be stored on the information recording medium is encrypted data on which encryption in block units has been performed using a block key Kb generated on the basis of the unit key Ku in CPS unit units in the manner described above.

When reproduction is to be performed, as described previously, it is necessary that, on the basis of various kinds of key generation information stored on the information recording medium, the CPS unit key Ku is generated, the block key Kb is generated on the basis of the block seeds that are set in block data units and the CPS unit key Ku, and a decryption process in block units is performed on the basis of the block key Kb.

FIG. 22(a) shows an example of the recording structure of data to be stored on the information recording medium. control data (UCD: User Control Data) of 18 bytes and user data (User Data) of 2048 bytes containing actual AV content data constitute one-sector data. For example, data of 6144 bytes for three sectors is set as one encryption processing unit, that is, a block. In addition to a method for setting the data as data of 6144 bytes for three sectors, blocks can be set variously, such as data of 2048 bytes for one sector being set as one encryption processing unit, that is, the data is set as a block. These specific examples will be described later.

FIG. 22(b) shows the structure of 1 unit (1 AU: Aligned Unit) serving as an encryption processing unit when data of 6144 bytes for three sectors is set as one block. Control data (User Control Data) of 18 bytes is excluded from an object for encryption, and only the user data that is actual AV content data is set as an encryption processing unit. The information processing apparatus for reproducing encrypted data stored on the information recording medium determines and extracts 1 AU (Aligned Unit), which is an encryption processing unit, on the basis of a flag within the control data.

Therefore, when data of 6144 bytes for three sectors is set as one block, on the basis of a flag within the control data, the information processing apparatus for reproducing encrypted data determines data of 6144 bytes, which is an encryption processing unit, as 1 AU, generates a block key Kb in 6144-byte units, and performs a decryption process. when data of 2048 bytes for one sector is set as one block, on the basis of the flag within the control data, the information processing apparatus for reproducing encrypted data generates a block key Kb in units of 2048 bytes, which is an encryption processing unit, and performs a decryption process.

When data of 6144 bytes for three sectors is set as one block, 1 unit (1 AU), which is an encryption processing unit, contains an area encrypted using the block key Kb, as shown in the example of encryption configuration in FIG. 22(c). In order to generate a block key, a block seed becomes necessary in the manner described above. The block seed is key generation information in block units, which is necessary for generating the block key Kb together with the CPS unit key Ku.

Figure 23:
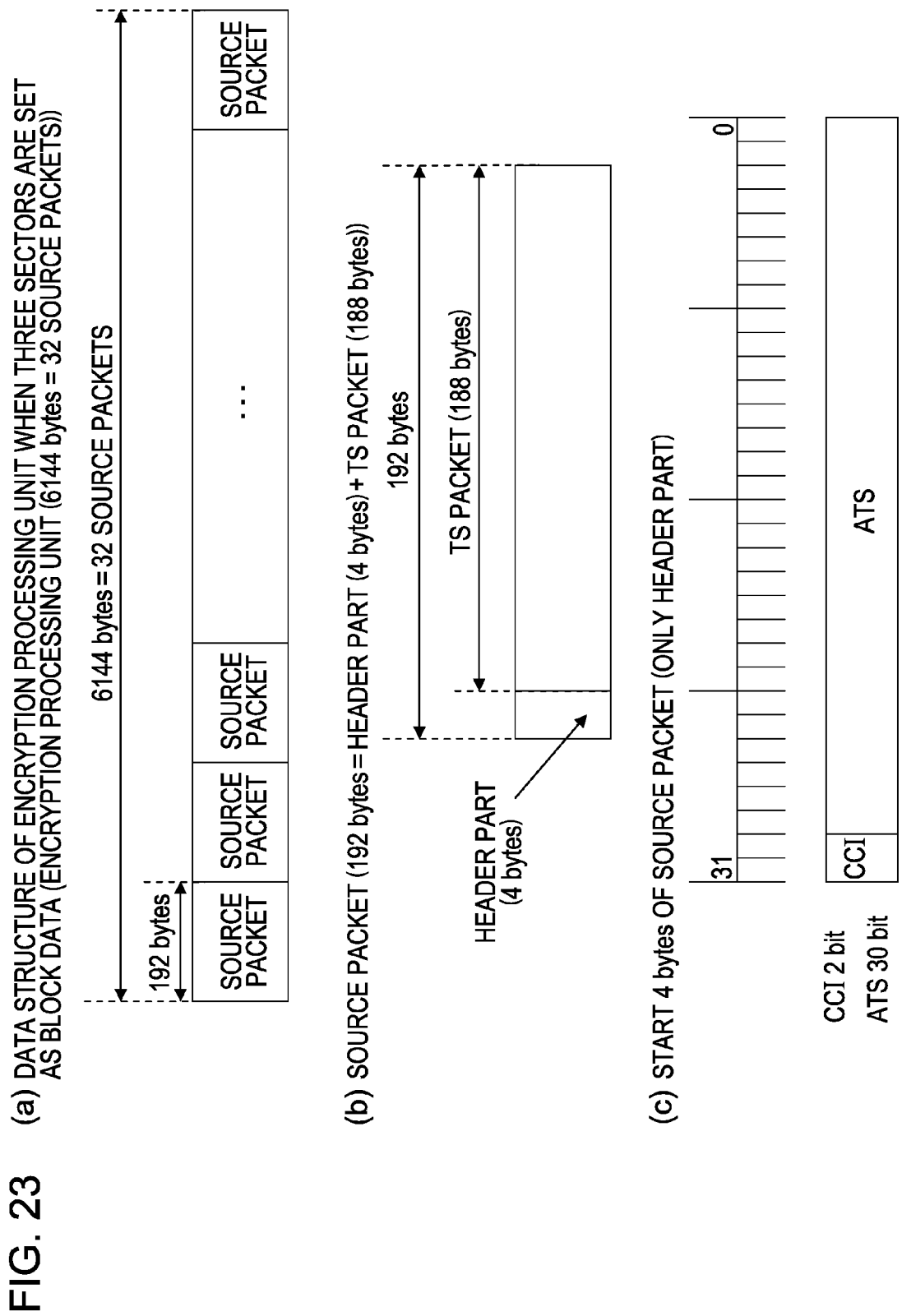
FIG. 23 illustrates a detailed structure of user data to be block-encrypted.

The detailed structure of user data to be block-encrypted is shown in FIG. 23. FIG. 23(a) shows data structure when three sectors is set as block data (encryption processing units (6144 bytes=32 source packets)).

An AV stream has a data structure that is defined in the Blu-ray disc rewritable format or in the Blu-ray disc ROM format. When data of 6144 bytes for three sectors is set as one block, as shown in FIG. 23(a), one CPS unit is set by continuous encryption processing units (blocks) of 6144 bytes. The data of 6144 bytes is composed of data for 32 source packets having a length of 192 bytes.

As shown in FIG. 23(b), each source packet is composed of a header part of 4 bytes and a TS packet part of 184 bytes. Encrypted content to be stored on the information recording medium is formed as a transport stream (TS) serving as encoded data, which is defined by, for example, the MPEG-2 system (ISO/IEC 13818-1). For the transport stream, a plurality of programs can be formed in one stream, and an ATS (Arrival Time Stamp) serving as appearance timing information of each transport packet is set.

FIG. 23(c) shows the detailed structure of a 4-byte header part of the source packet. the start 2 bits of the 4-byte header part is copy/play control information CCI (Copy Control Information), and following it, an ATS (Arrival Time Stamp) serving as appearance timing information of each transport packet is set. The time stamp is determined when encoding is to be performed so that a T-STD (Transport Stream System Target Decoder), which is a virtual decoder defined by the MPEG-2 system, does not fail. When a stream is to be reproduced, the appearance timing is controlled by an ATS attached to each transport packet, and decryption and reproduction are performed.

For example, when transport stream packets are to be recorded on the information recording medium, they are recorded as source packets in which the packets are put close together. By storing the packets on the recording medium together with the appearance timing of each transport packet, it becomes possible to control the output timing of each packet when the stream is to reproduced.

A description will be given below of two specific examples of encryption and decryption processes in units of block data by using the block key Kb.

(1) Processing Example 1

Figure 24:
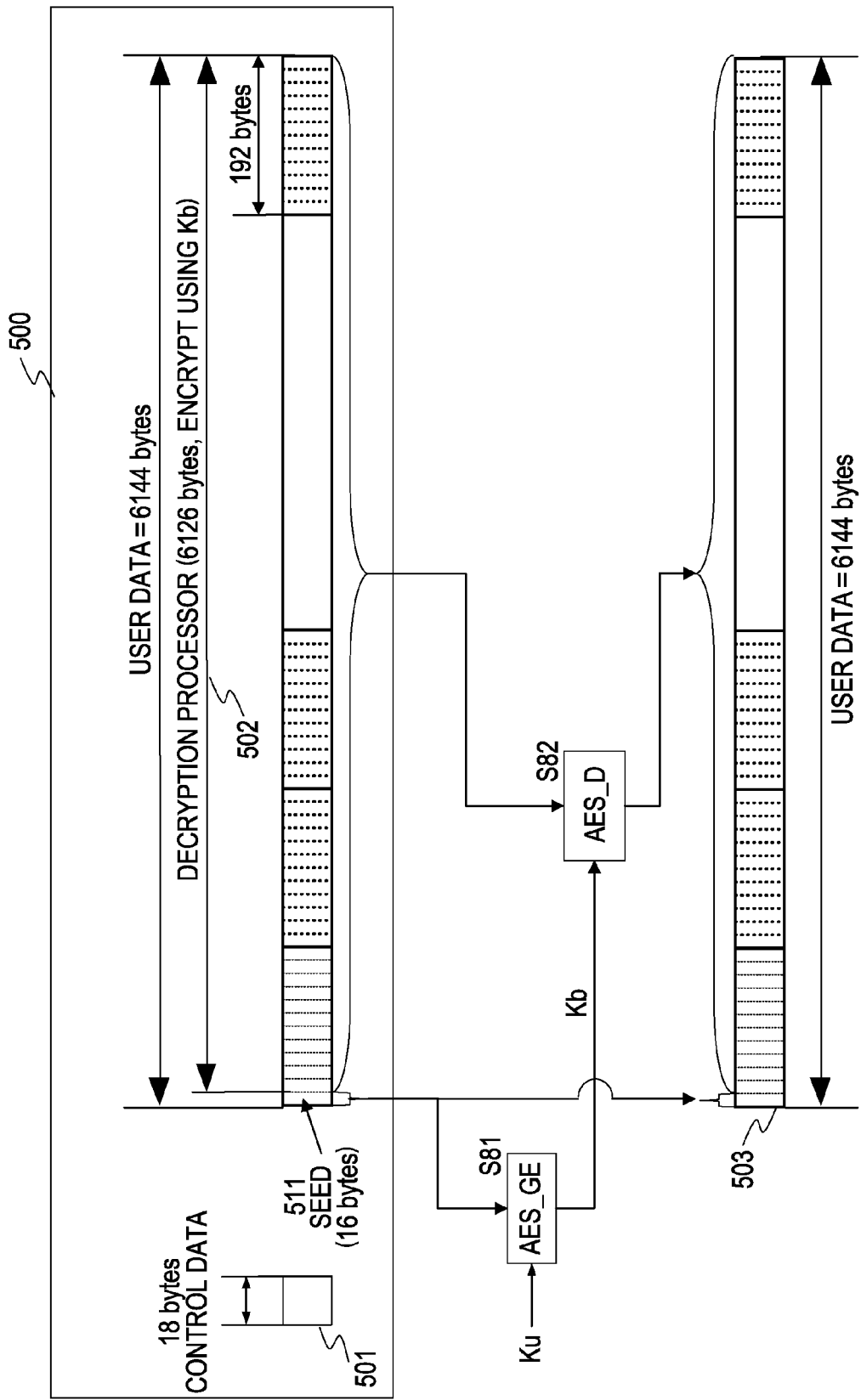
FIG. 24 illustrates an example of a process for decrypting encrypted content and reproducing the content.

An encryption processing unit (block) 500 shown in FIG. 24 is one encryption processing unit (block) constituting encrypted content (CPS units) stored on an information recording medium.

The encryption processing unit 500 is composed of user data for three sectors (6144 bytes) and user control data (UCD) 501 of 18 bytes corresponding to the start sector of the user data. A block seed 511 is set in the start 16 bytes (128 bits) of the user data for three sectors (6144 bytes), and a data part encrypted using the block key Kb is a decryption processing part 502 shown in the figure.

An information processing apparatus for reproducing content sequentially obtains encryption processing units. For example, in selector processing execution step S46 described with reference to FIG. 11, the information processing apparatus performs a process for separating the block seed (16 bytes) 511 from the decryption processing part 502 other than the block seed 511.

The process in step S81 of FIG. 24 is a process for generating a block key Kb. in step S81, an AES encryption process or a hash process using a unit key Ku is performed on the block seed 511, thereby generating a block key Kb.

The process of step S82 of FIG. 24 is a process corresponding to, for example, the decryption process of step S48 in FIG. 11. in step S82, the decryption processing part 502 is input, and an AES decryption process using the block key Kb generated in step S81 is performed.

As a result of performing the decryption process in step S82, decrypted user data 503 is generated, and this data is output to the reproduction control processing means 420 shown in FIG. 10.

(2) Processing Example 2 processing example 2 is set as follows, for example, encryption processing unit (block): user data for one sector (2048 bytes), data to be encrypted: part (2032 bytes) excluding the start 16 bytes (128 bits) for one sector (2048 bytes), and block seed: start 16 bytes (128 bits) of user data for one sector (2048 bytes).

Figure 25:
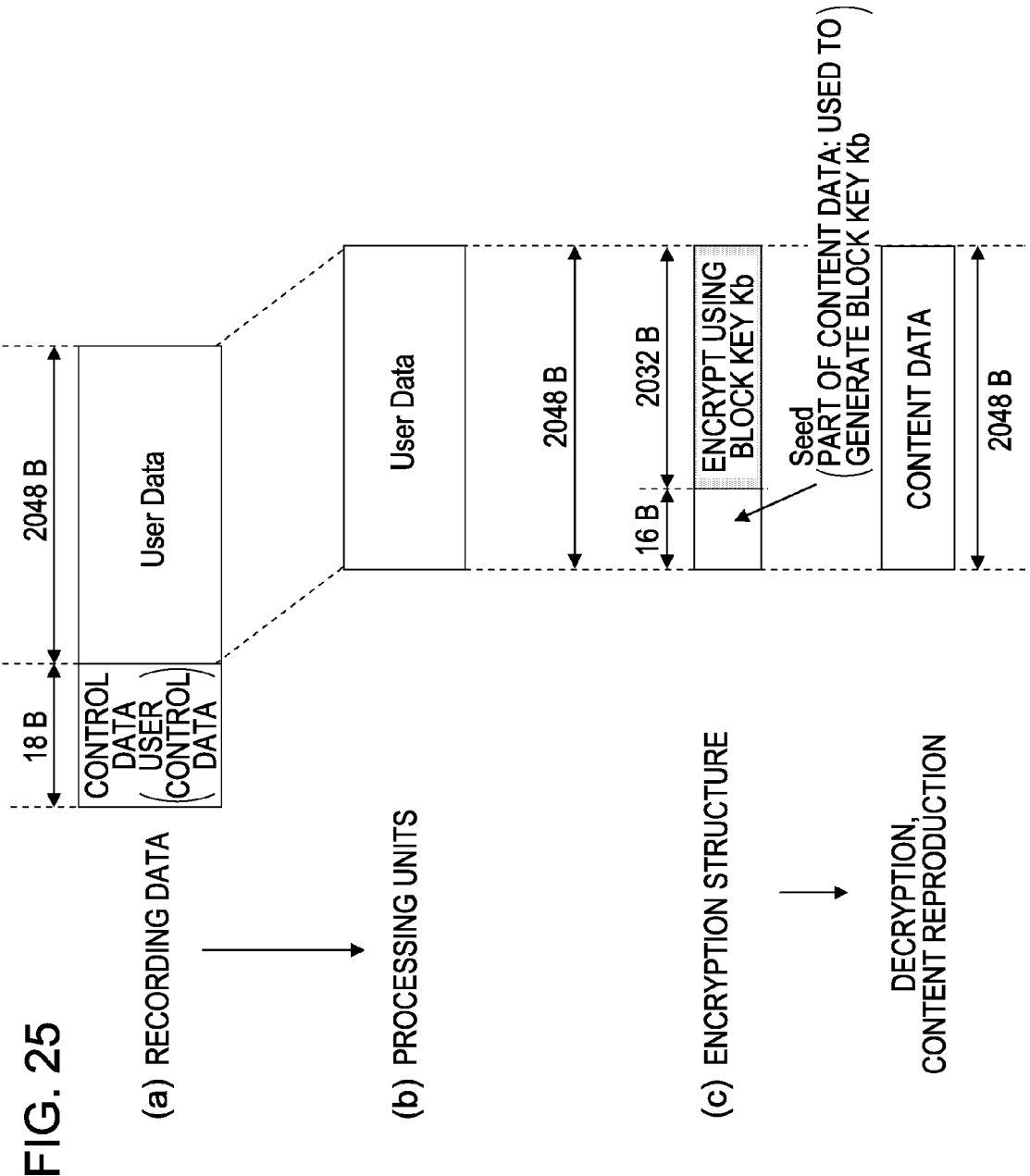
FIG. 25 illustrates an example of the structure of recording data of encrypted content.
Figure 26:
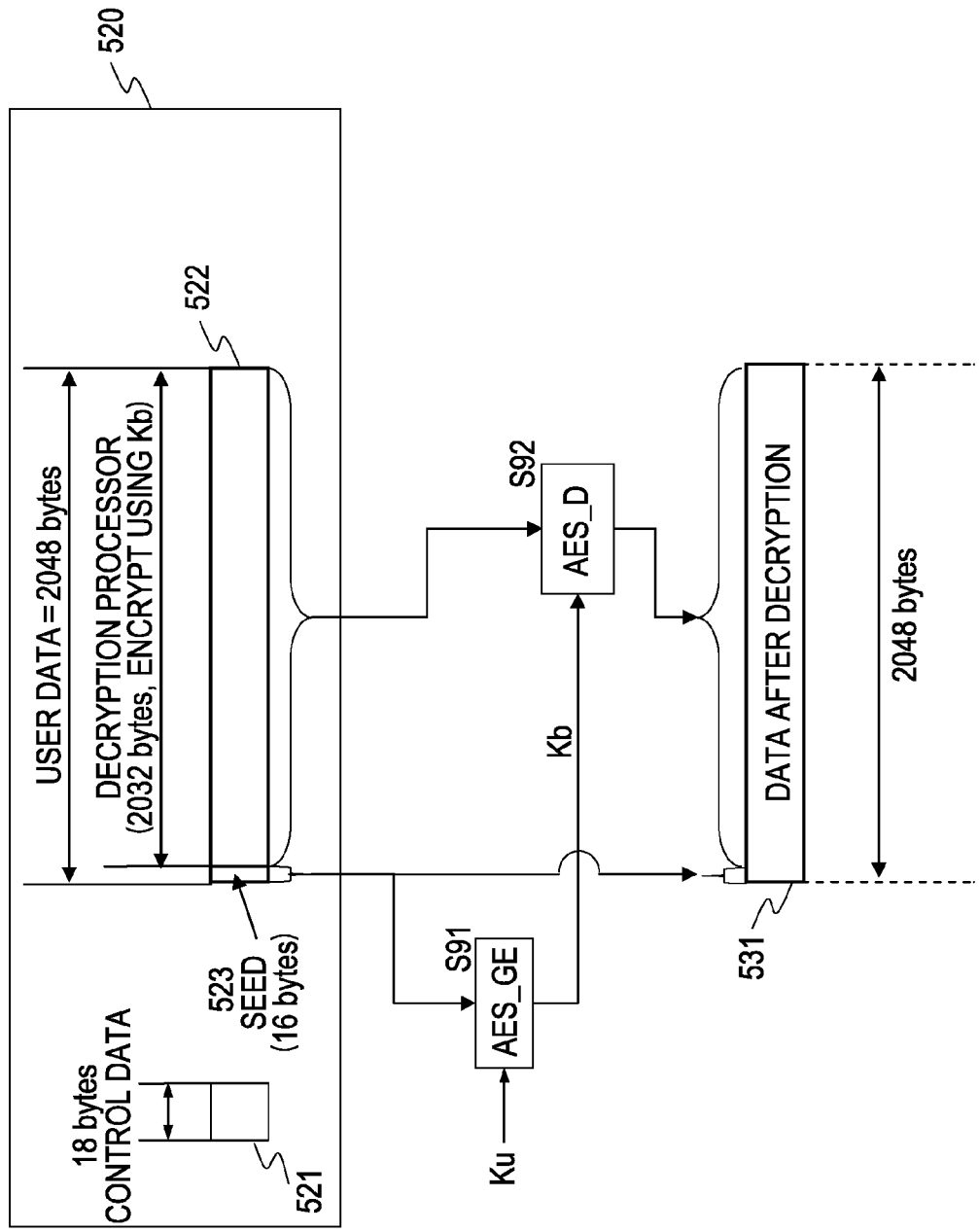
FIG. 26 illustrates an example of a process for decrypting encrypted content and reproducing the content.

An example of the recording data structure in the processing example 2 is shown in FIG. 25, and an example of a decryption process is shown in FIG. 26.

A description will be given first, with reference to FIG. 25, of the recording data structure in the processing example 2. FIG. 25(a) shows user data for one sector (2048 bytes) and user control data of 18 bytes corresponding to a sector.

As shown in FIG. 25(b), user data for one sector (2048 bytes) is set as one encryption processing unit (block).

As shown in the encryption configuration in FIG. 25(c), the block seed is set as the start 16 bytes (128 bits) of the user data for one sector (2048 bytes).

The description of content data to be encrypted is as desired, and data of the part corresponding to the block seed also can become any desired byte string. Depending on the description of the content data, a byte string of a specific pattern could be arranged in the block seed part, and it is not guaranteed that the value of the block key Kb generated using a block seed becomes a value different for each encryption processing unit.

The advantages of using this method are that, if data for one sector (2048 bytes) is obtained, a block seed can be obtained, a block key can be generated, content data can be decrypted, and compatibility with a system, such as a drive connected to a PC, in which data in units of 2048 bytes is used as a general-purpose process unit, is high.

Next, a description will be given, with reference to FIG. 26, of a decryption process sequence for recording data in this processing example. An encryption processing unit (block) 520 shown in FIG. 26 is one encryption processing unit (block) constituting encrypted content (CPS units) stored on an information recording medium.

The encryption processing unit 520 is composed of user data 522 for one sector (2048 bytes) and user control data (UCD) 521 of 18 bytes corresponding to the start sector of the user data. In this example, a block seed 523 is set as the start 16 bytes (128 bits) of the user data 522 for one sector (2048 bytes).

The information processing apparatus for reproducing content sequentially obtains encryption processing units. In the selector processing execution step S46 described with reference to FIG. 11, the information processing apparatus separates the block seed (16 bytes) 523 from the encrypted data part (2032 bytes) other than the block seed 523. The user control data (UCD) 521 is separated as non-encrypted data.

The process of step S91 of FIG. 26 is a process for generating a block key Kb. in step S91, an AES key generation process algorithm using a unit key Ku or a hash process is performed on the block seed 523 composed of the start 16 bytes (128 bits) of the user data for one sector (2048 bytes), thereby generating a block key Kb.

The process of step S92 of FIG. 26 is a process corresponding to the decryption process in step S48 of FIG. 11. in step S92, user data of the encrypted data (2032 bytes) excluding the start 16 bytes (128 bits) of the user data for one sector (2048 bytes) is input, and an AES decryption process using the block key Kb generated in step S91 is performed.

Furthermore, for example, in selector step S49 shown in FIG. 11, decrypted data 531 is generated as data such that the decryption result of the encrypted data part excluding the block seed 523 of the start 16 bytes (128 bits) of the user data of 2048 bytes and the block seed 523 are combined, and the result is output to the reproduction control processing means 420 shown in FIG. 10.

[6. Detailed Structure of Copy/Play Control Information (CCI)]

Figure 27:
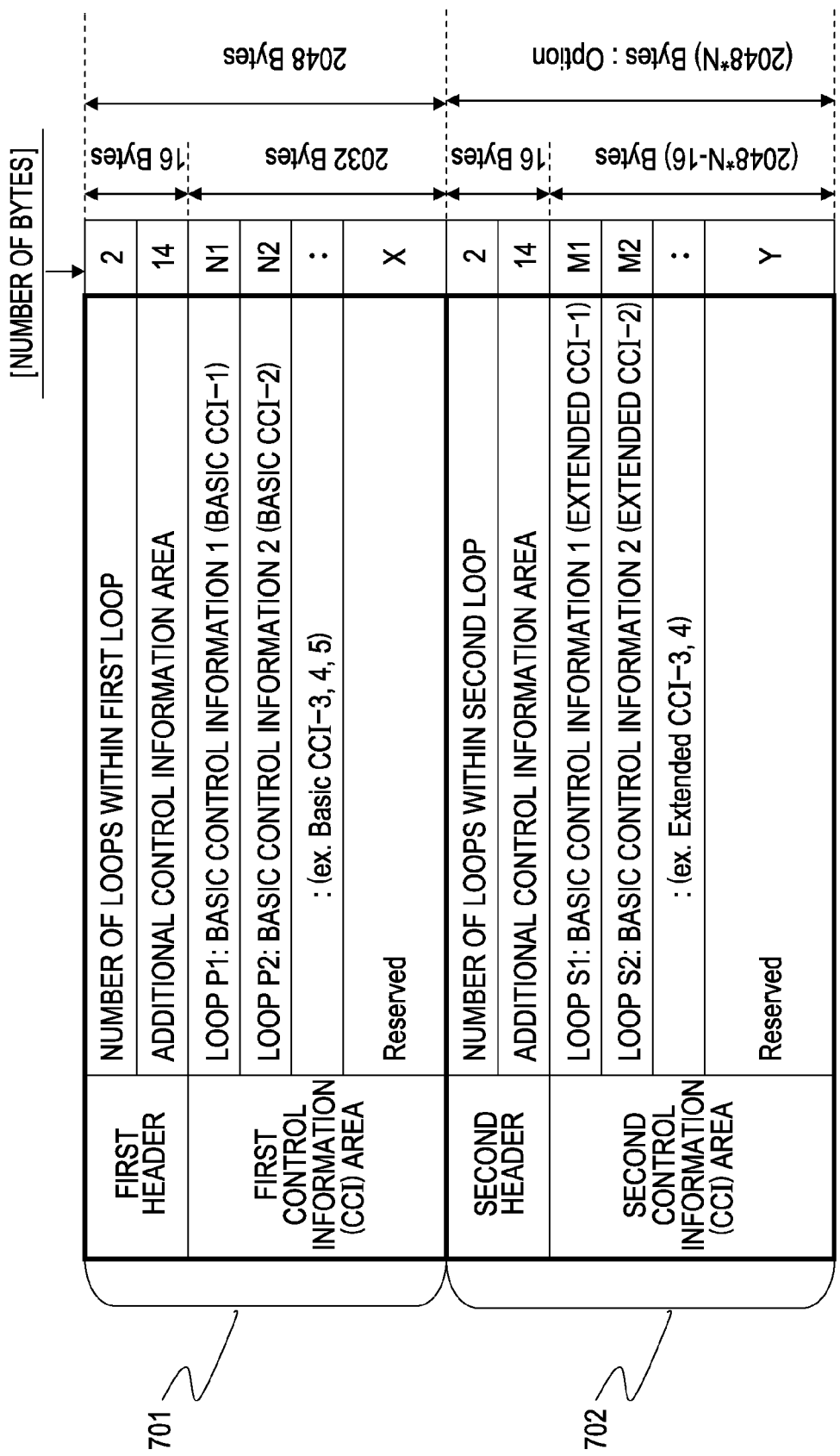
FIG. 27 illustrates the structure of a copy/play control information (CCI) file corresponding to a content management unit (CPS unit).

Next, a description will be given below of a detailed structure of copy/play control information (CCI). Referring to FIG. 27, a description will be given of an example of the structure of a copy/play control information (CCI) file corresponding to one content management unit (CPS unit).

Copy/play control information (CCI) corresponding to each CPS unit is divided into user data areas of 2048 bytes constituting block data and is stored. FIG. 27 shows a first block 701 serving as a user data area of 2048 bytes constituting block data in which copy/play control information (CCI) is stored, and a succeeding block 702. The succeeding block 702 is composed of one or more blocks. The succeeding block 702 is user data of n blocks and is set as data of 2048×N bytes.

In the first block 701, the total number of bytes of the user data is 2048 bytes, and the following data is stored: (a) a first header part: 16 bytes, and (b). first control information (CCI) area: 2032 bytes.

In the first header part (16 bytes), information on the number of loops of copy/play control information (CCI) (play/copy control information) contained in the first control information (CCI) area, and an additional control information area are set.

The additional information area that is set in the first header part is an area used for adding or extending copy/play control information, such as, a flag for prohibiting reproduction based on only the basic control information being arranged in a reproduction apparatus that supports only the basic control information.

In the first control information (CCI) area (2032 bytes) following the header part, copy/play control information (CCI) (play/copy control information) corresponding to each CPS unit is stored.

FIG. 27 shows an example in which, as the copy/play control information (CCI) (play/copy control information) of the first block 701, the following two kinds of control information are contained: basic control information 1 (basic CCI-1), and extended control information 2 (basic CCI-2). In the example shown in the figure, an example is shown in which five basic control information (basic CCI-1 to CCI-5) blocks are stored.

The basic control information (basic CCI) is data composed of a basic minimum of copy/play control information (CCI) (play/copy control information). the basic control information is read by almost all the information processing apparatuses for performing a content reproduction process in accordance with a predetermined content reproduction process program, and is information on which processing in accordance with control information is requested to be performed. on the other hand, the extended control information (extended CCI) is data composed of extended copy/play control information (CCI) (play/copy control information) for use with an information processing apparatus having a processing function, such as a sophisticated content using process, for example, network transfer, data streaming transmission and reception, or the like.

It is requested that the basic control information (basic CCI) be quickly extracted from the play/copy control information storage file. For the extended control information (extended CCI), a storage method with less limitation on the size or the like is adopted for future extension. Specific examples of the basic control information (basic CCI) and the extended control information (extended CCI) are shown in FIG. 28.

As shown in FIG. 28, the basic control information (basic CCI) contains, for example, the following control information:

copy capability/incapability information: copy capable/incapable/capable for only one generation video output resolution limitation information: presence/absence of output limitation analog copy limitation information: capable/incapable (analog copy prevention technology to be used is specified)

information indicating presence or absence of encryption: presence/absence of encryption information indicating presence or absence of rights assertion: presence/absence of rights assertion the extended control information (extended CCI) contains, for example, the following control information.

reproduction capability/incapability information with an information recording medium (disc) alone: indicates whether or not content reproduction is possible using only information on disc method of reproducing content that cannot be reproduced with an information recording medium (disc) alone: "connection to key distribution server", "insert a memory card in which a key is put", etc.

designation of a server: an index value to a server list copy streaming compatibility information: compatibility information for allowing content to be reproduced by another device in the network A data conversion method during copy streaming: a method that can be used when content is to be converted into that for another device Furthermore, the extended control information is composed of copy limitation information such as capability/incapability of copying onto same type of recording medium in the network, copy limitation information such as capability/incapability of copying into a mobile phone, information such as capability/incapability of streaming and remote reproduction, control information for a download process, information for obtaining operation limitation information from the server, and the like.

For the extended control information (extended CCI), any control information can be set.

Referring back to FIG. 27, the description of the block data in which the copy/play control information (CCI) is stored is continued. the succeeding block 702 shown in FIG. 27 is user data of n blocks, and is composed of data of 2048×N bytes.

In the user data of the succeeding block 702, the following data is stored: (a) a second header part: 16 bytes, (b) second control information (CCI) area: any number of bytes.

The second header part (16 bytes) is the start 16 bytes of the user data of a second block following the first block 701. In this area, information on the number of loops of copy/play control information (CCI) (play/copy control information) contained in the second control information (CCI) area and a reserved area are set. The data of the second header part (16 bytes) is used as seed information for generating a block key corresponding to the start 2048 bytes of the second block.

The second control information (CCI) area (any number of bytes) is set as an area for storing a plurality of pieces of copy/play control information (CCI) (play/copy control information) in a range not exceeding (2048×N−16) bytes such that the header part is excluded from the data size (2048× N) bytes of the succeeding block 702. In FIG. 27, an example is shown in which a total of four information blocks of extended control information (extended CCI-1 to CCI-4) are stored.

With the above configuration, the reproduction apparatus that uses only the basic control information extracts basic control information by reading the start 2048 bytes of the CCI file, making it possible to perform reproduction and control a copying operation.

Figure 29:
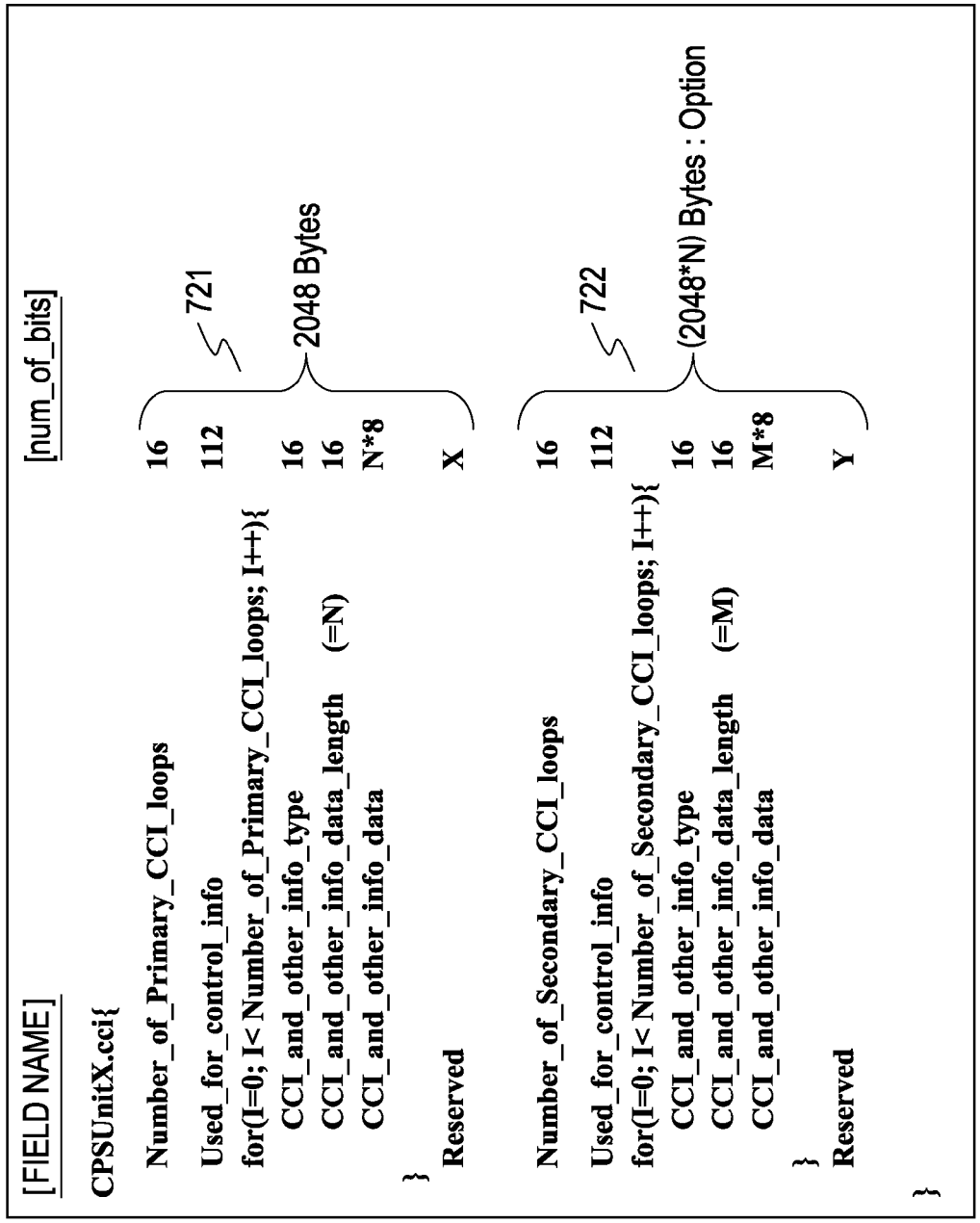
FIG. 29 is a syntax diagram corresponding to an example of storage of the copy/play control information (CCI) shown in FIG. 27.

FIG. 29 is a syntax diagram corresponding to an example of the storage of copy/play control information (CCI) shown in FIG. 27. First block area data 721 formed of start 2048 bytes and succeeding block area data 722 having an integral multiple of 2048 bytes, which is arranged subsequent to the first block area data 721, exist.

In the first block area data 721, as header part information, the following are set: [Number_of_Primary_CCI_loop] as information indicating the number of information blocks (loop) constituting copy/play control information (CCI) (play/copy control information) described in the first block area: 16 bits, and control information [used for control info] area: 112 bits. The above-described data is 16-byte data of the header part.

Furthermore, as the first control information (CCI) area information, the following are set: [CCI_and_other_info_type] as data type information of copy/play control information (CCI) (play/copy control information): 16 bits, [CCI_and_other_info_data length] as data length information of copy/play control information (CCI) (play/copy control information): 16 bits, [CCI_and_other_info_data] as data value information of copy/play control information (CCI) (play/copy control information): (CCI_and_other_info_data length×8) bits, and a reserved [reserved] area: X bits.

The data structure of the succeeding block area data 722 is almost identical to that of the first block area. A header composed of information indicating the number of loops and control information area, and a copy/play control information (CCI) (play/copy control information) part containing data type, a data length, and a data value are set.

[7. Example of the Configuration of the Information Processing Apparatus]

Next, a description will be given, with reference to FIG. 30, of an example of the configuration of an information processing apparatus for recording or reproducing main content and subcontent having the above-described content management units (CPS units).

An information processing apparatus 800 includes a drive 890 for driving an information recording medium 891 and for inputting and outputting a data recording or reproduction signal, a CPU 870 for performing data processing in accordance with various kinds of programs, a ROM 860 serving as an area for storing the programs, parameters, and the like, a memory 880, an input/output I/F 810 for inputting and outputting a digital signal, an input/output I/F 840 for inputting and outputting an analog signal, the input/output I/F 840 having an A/D-D/A converter 841, an MPEG codec 830 for encoding and decoding MPEG data, TS and PS processing means 820 for performing TS (Transport Stream) and PS (Program Stream) processes, and encryption processing means 850 for performing various kinds of encryption processes. Each block is connected to a bus 801.

The operation when data is to be recorded will be described first. Two cases of inputting a digital signal and an analog signal as data to be recorded are considered.

In the case of a digital signal, data, which is input from the input/output I/F 810 for digital signals and on which an appropriate encryption process has been performed as necessary by the encryption processing means 850, is stored on the information recording medium 891. When the data format of the input digital signal is to be converted and stored, it is converted into a data format for storage by the MPEG codec 830, the CPU 870, and the TS and PS processing means 820. Thereafter, the encryption processing means 850 performs an appropriate encryption process thereon and stores the signal on the information recording medium 891.

In the case of an analog signal, the analog signal input to the input/output I/F 840 is converted into a digital signal by the A/D converter 841, and the signal is converted into that for a codec used during recording by means of the MPEG codec 830. Thereafter, the signal is converted into AV multiplexed data in a recording data format by the TS and PS processing means 820, and data on which an appropriate encryption process has been performed as necessary by the encryption processing means 850 is stored on the recording medium 891.

For example, when main content formed of AV stream data composed of MPEG-TS data is to be recorded, the main content is divided into content management units (CPS units). Thereafter, an encryption process using a unit key is performed by the encryption processing means 850, and the content is recorded on the recording medium 891 via the drive 890.

The subcontent is also divided into content management units (CPS units) corresponding to each of data groups. Thereafter, an encryption process using a unit key is performed by the encryption processing means 850, and the content is recorded on the recording medium 891 via the drive 890.

Next, a description will be given of processing when data is reproduced from an information recording medium. For example, when AV stream data formed of MPEG-TS data as main content is to be reproduced, data read from the information recording medium 891 in the drive 890 is identified as a content management unit. thereafter, a process for obtaining a unit key corresponding to the content management unit is performed, and on the basis of the obtained unit key, encryption is decrypted by the encryption processing means 850, and the data is divided into each of data, such as video, audio, subtitles, and the like by the TS (Transport Stream) and PS (Program Stream) processing means 820.

The digital data decoded by the MPEG codec 830 is converted into an analog signal by the D/A converter 841 in the input/output I/F 840 and is output. When digital output is to be performed, MPEG-TS data decrypted by the encryption processing means 850 is output as digital data via the input/output IF 810. The output in this case is performed with respect to, for example, a digital interface, such as IEEE 1394, an Ethernet cable, or a wireless LAN. When a network connection function is to be supported, the input/output IF 810 has a network connection function. when, in the reproduction apparatus, data is converted into a format with which the output target device can receive the data and is output, the MPEG codec 830 performs rate conversion and a codec conversion process on video, audio, subtitles, and the like that are separated at one time by the TS and PS processing means 820, and data multiplexed into an MPEG-TS, an MPEG-PS, or the like again by the TS and PS processing means 820 is output from the digital input/output I/F 810. Alternatively, it is also possible to convert the data into a codec other than MPEG or a multiplexed file by using the CPU 870 and to output it from the digital input/output I/F 810.

Also, in the case of subcontent, when the subcontent is identified as a content management unit, a process for obtaining a unit key corresponding to the content management unit is performed. On the basis of the obtained unit key, the encryption processing means 850 decrypts the encryption and performs a reproduction process. Key information for each content management unit (CPS unit), which is necessary when reproduction is to be performed, can be obtained from data held in a memory 880. When the unit key has not been stored on the information recording medium, it can be obtained by performing a predetermined procedure from the network-connected server.

As described above, one unit key is assigned to a content management unit (CPS unit). The reproduction application program for centrally controlling content reproduction detects an occurrence of switching of the content management unit (CPS unit), and switches the key to be used in response to the switching. When a key has not been obtained, a process for displaying a message for prompting obtaining of the key is performed.

In the recording and reproduction apparatus, when necessary information is to be obtained via a network outside the apparatus, the obtained data is stored in the memory 880 in the recording and reproduction apparatus. Data to be stored includes key information necessary for reproducing content, subtitles to be reproduced in synchronization with the content reproduction time, audio information, data such as still images, a content management information operation rule (usage rule) of the reproduction apparatus corresponding to content management information, and the like.

A program for executing the reproduction process and the recording process is stored in the ROM 860. While the program is being executed, the memory 880 is used as an area for storing parameters and data and as a work area as necessary. in FIG. 30, a description has been given by showing the configuration of the apparatus capable of recording and reproducing data. Alternatively, an apparatus having only a reproduction function, and an apparatus having only a recording functions can also be configured. The present application can be applied to these apparatuses.

The series of processes described in the specification can be performed by hardware, software, or the combined configuration of them. When the series of processes is to be performed by software, a program in which a processing sequence is recorded is installed in a memory of a computer that is incorporated in specialized hardware, whereby the program is executed, or the program is installed into a general-purpose computer capable of performing various processes, whereby the program is executed.

For example, the program can be recorded in advance in a hard disk and a ROM (Read Only Memory) serving as recording media. Alternatively, the program can be temporarily or permanently stored (recorded) on a removable recording medium, such as a flexible disk, a CD-ROM (Compact Disc Read Only Memory), an MO (Magneto optical) disc, a DVD (Digital Versatile Disc), a magnetic disk, or a semiconductor memory. Such a removable recording medium can be provided as packaged software.

In addition to being installed into the computer from the above-described removable recording medium, the program may be transferred wirelessly from a download site or may be transferred by wire to a computer via a network, such as a LAN (Local Area Network) or the Internet. It is possible for the computer to receive the program that is transferred in such a manner and to install the program into a recording medium such as a hard disk contained therein.

Various processes described in the specification may be executed not only in a time-series manner according to the description, and may also be executed in parallel or individually according to the processing performance of the apparatus that performs processing or as necessary. In this specification, the system designates a logical assembly of a plurality of devices. It is not essential that the devices be disposed in the same housing.

INDUSTRIAL APPLICABILITY

As has thus been described, according to the configuration of the present application, content management units (CPS units) such that content stored on an information recording medium is divided into units are set. a unit key is assigned to each content management unit (CPS unit). Data forming each unit is encrypted and recorded. During reproduction, it is essential that a unit key be generated and data processing using the unit key be performed. Furthermore, as information for generating a unit key, copy/play control information (CCI) that is set so as to correspond to a content management unit (CPS unit), and a content hash that is a hash value based on the data forming the content management unit (CPS unit) are used. Therefore, when the copy/play control information (CCI) and the content data are tampered, a correct unit key cannot be generated, the copy/play control information (CCI) and the content data can be prevented from being tampered, unauthorized use of content can be revoked, and authorized content usage can be realized. In addition, it is not necessary for the reproduction apparatus to perform a process for verifying presence or absence of data tampering, and efficient data reproduction becomes possible.

It should be understood that various changes and modifications to the presently preferred embodiments described herein will be apparent to those skilled in the art. Such changes and modifications can be made without departing from the spirit and scope of the present application and without diminishing its intended advantages. It is therefore intended that such changes and modifications be covered by the appended claims.

What is claimed is:

1. An information processing apparatus for performing a process for reproducing content from an information recording medium, the information processing apparatus comprising:
   a processor; and
   a memory device storing instructions, which when executed by the processor, cause the processor to:
   (a) generate a copy control key using a copy/play control information file which is stored on the information recording medium, the generated copy control key corresponding to each of a plurality of content management units stored on the information recording medium, the copy/play control information file being set to correspond to at least one of the content management units;

(b) obtain an encrypted unit key which is stored on the information recording medium;

(c) generate a decrypted unit key by, using the generated copy control key, decrypting the encrypted unit key;

(d) decrypt, using the decrypted unit key, encrypted content stored on the information recording medium, wherein the encrypted content, the copy/play control information file, and the encrypted unit key are separately set on the information recording medium, and wherein the copy/control information file includes basic copy/play control information and extended copy/play control information including extended content usage information other than the basic copy/play control information.

2. The information processing apparatus of claim 1, wherein the basic copy/play control information includes at least one of a) copy capability information, b) video output resolution limitation information, c) analog copy limitation information, d) information indicating presence or absence of encryption, and e) information indicating presence or absence of rights assertion.

3. The information processing apparatus of claim 1, wherein when executed by the processor, the instructions cause the processor to generate the copy control key by performing at least one of:

(a) an AES encryption process using the copy/play control information file read from the information recording medium; and (b) data processing based on a hash function using the copy/play control information file read from the information recording medium.

4. A method of operating an information processing apparatus including instructions, the method comprising:

causing a processor to execute the instructions to generate a copy control key using a copy/play control information file which is stored on an information recording medium, the generated copy control key corresponding to each of a plurality of content management units stored on the information recording medium, the copy/play control information file being set to correspond to at least one of the content management units;

causing the processor to execute the instructions to obtain an encrypted unit key which is stored on the information recording medium;

causing the processor to execute the instructions to generate a decrypted unit key by, using the generated copy control key, decrypting the encrypted unit key;

causing the processor to execute the instructions to decrypt, using the decrypted unit key, encrypted content stored on the information recording medium, wherein the encrypted content, the copy/play control information file, and the encrypted unit key are separately set on the information recording medium, and wherein the copy/control information file includes basic copy/play control information and extended copy/play control information including extended content usage information other than the basic copy/play control information.

5. The method of claim 4, wherein the basic copy/play control information includes at least one of a) copy capability information, b) video output resolution limitation information, c) analog copy limitation information, d) information indicating presence or absence of encryption, and e) information indicating presence or absence of rights assertion.

6. The method of claim 4, wherein causing the processor to execute the instructions to generate the copy control key is performed by at least one of:

(a) an AES encryption process using the copy/play control information file read from the information recording medium; and (b) data processing based on a hash function using the copy/play control information file read from the information recording medium.

7. A non-transitory computer readable medium including instructions structured to cause a computer to:

generate a copy control key using a copy/play control information file which is stored on an information recording medium, the generated copy control key corresponding to each of a plurality of content management units stored on the information recording medium, the copy/play control information file being set to correspond to at least one of the content management units;

obtain an encrypted unit key which is stored on the information recording medium;

generate a decrypted unit key by, using the generated copy control key, decrypting the encrypted unit key;

decrypt, using the decrypted unit key, encrypted content stored on the information recording medium, wherein the encrypted content, the copy/play control information file, and the encrypted unit key are separately set on the information recording medium, and wherein the copy/control information file includes basic copy/play control information and extended copy/play control information including extended content usage information other than the basic copy/play control information.

8. The non-transitory computer readable medium of claim 7, wherein the basic copy/play control information includes at least one of a) copy capability information, b) video output resolution limitation information, c) analog copy limitation information, d) information indicating presence or absence of encryption, and e) information indicating presence or absence of rights assertion.

9. The non-transitory computer readable medium of claim 7, wherein the instructions cause the computer to generate the copy control key by performing at least one of:

(a) an AES encryption process using the copy/play control information file read from the information recording medium; and (b) data processing based on a hash function using the copy/play control information file read from the information recording medium.

* * * * *